(12) United States Patent
Harano

(10) Patent No.: US 9,001,341 B2
(45) Date of Patent: Apr. 7, 2015

(54) PRINTING APPARATUS, CONTROL METHOD FOR PRINTING APPARATUS, AND STORAGE MEDIUM

(71) Applicant: Canon Kabushiki Kaisha, Tokyo (JP)

(72) Inventor: Yuzo Harano, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/770,894

(22) Filed: Feb. 19, 2013

(65) Prior Publication Data

US 2013/0215447 A1 Aug. 22, 2013

(30) Foreign Application Priority Data

Feb. 21, 2012 (JP) .................... 2012-035117

(51) Int. Cl.
*G06F 3/12* (2006.01)
*G03G 15/00* (2006.01)
*G06K 15/00* (2006.01)

(52) U.S. Cl.
CPC ........ *G06K 15/4065* (2013.01); *G03G 15/6508* (2013.01); *G06K 15/002* (2013.01)

(58) Field of Classification Search
None
See application file for complete search history.

(56) References Cited

U.S. PATENT DOCUMENTS

| | | | |
|---|---|---|---|
| 2005/0104272 A1* | 5/2005 | Watanabe et al. | 271/9.05 |
| 2008/0003011 A1 | 1/2008 | Unno | |
| 2008/0258374 A1* | 10/2008 | Inoue | 271/9.03 |
| 2009/0166949 A1* | 7/2009 | Unno | 271/9.03 |
| 2009/0261524 A1* | 10/2009 | Nakayama et al. | 271/3.14 |
| 2010/0295235 A1 | 11/2010 | Kanamoto | |

FOREIGN PATENT DOCUMENTS

| | | |
|---|---|---|
| CN | 1188913 A | 7/1998 |
| CN | 1991606 A | 7/2007 |
| CN | 101004669 A | 7/2007 |
| JP | 2006036423 A | 2/2006 |
| JP | 2009-256076 A | 11/2009 |

* cited by examiner

*Primary Examiner* — Marivelisse Santiago Cordero
*Assistant Examiner* — Moustapha Diaby
(74) *Attorney, Agent, or Firm* — Canon USA Inc. IP Division

(57) ABSTRACT

A printing apparatus according to the present invention can change according to a type of a job whether to switch storage units within a group in accordance with an amount of sheets reaches a certain amount.

8 Claims, 17 Drawing Sheets

FIG.4A

SHEET CASSETTE SETTING — 501

| SHEET CASSETTE INFORMATION | GROUP INFORMATION | COPY | PRINT | BOX PRINT |
|---|---|---|---|---|
| 502 — 1: A4 - PLAIN PAPER | G1 | ☑ | ☐ | ☐ |
| 503 — 2: A4 - PLAIN PAPER | G1 | ☑ | ☐ | ☐ |
| 504 — 3: A4 - PLAIN PAPER | G2 | ☐ | ☑ | ☐ |
| 505 — 4: A4 - PLAIN PAPER | G2 | ☐ | ☑ | ☐ |
| 506 — 5: A3 - RECYCLED PAPER | N/A | ☐ | ☐ | ☐ |

512

OK — 507

SHEET CASSETTE SETTING SCREEN

CHANGE OF SHEET CASSETTE INFORMATION

~ SHEET CASSETTE 3 ~

| SHEET SIZE | A4 | — 509 |
| SHEET TYPE | PLAIN PAPER | — 510 |
| GROUP NUMBER | 2 | — 511 |

514 — CANCEL     OK — 513

SHEET CASSETTE INFORMATION CHANGE SCREEN

FIG.5
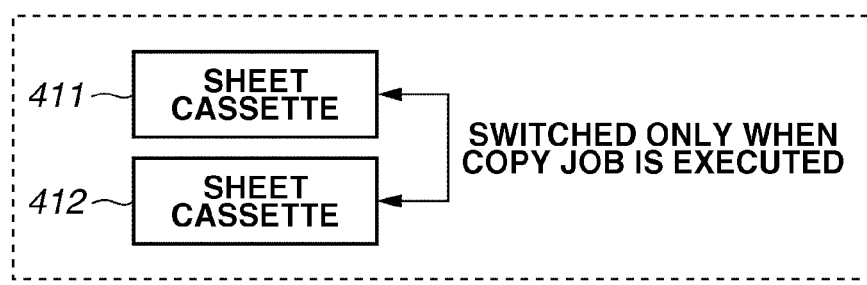
CONTROL OPERATION OF GROUP NUMBER 1
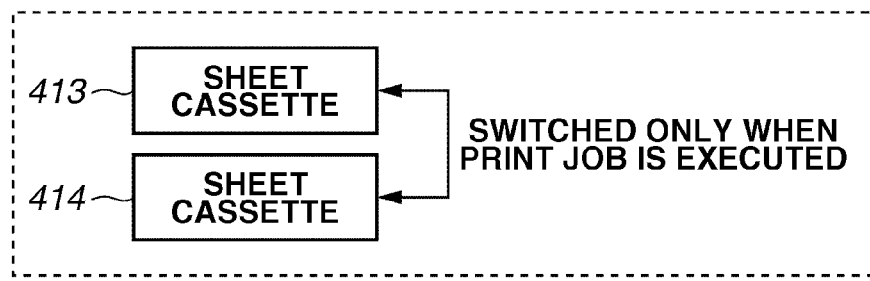
CONTROL OPERATION OF GROUP NUMBER 2
NO GROUP IS SPECIFIED

FIG.9
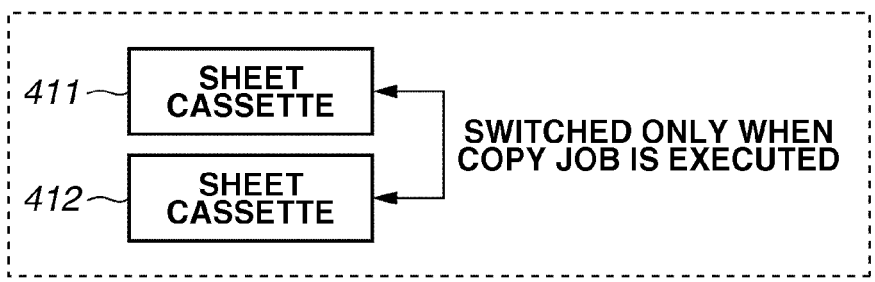
CONTROL OPERATION OF GROUP NUMBER 1
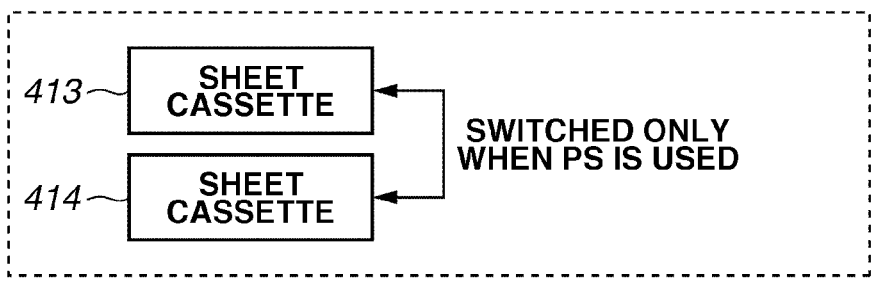
CONTROL OPERATION OF GROUP NUMBER 2
NO GROUP IS SPECIFIED

SHEET CASSETTE SETTING SCREEN

SHEET CASSETTE INFORMATION CHANGE SCREEN

FIG.15
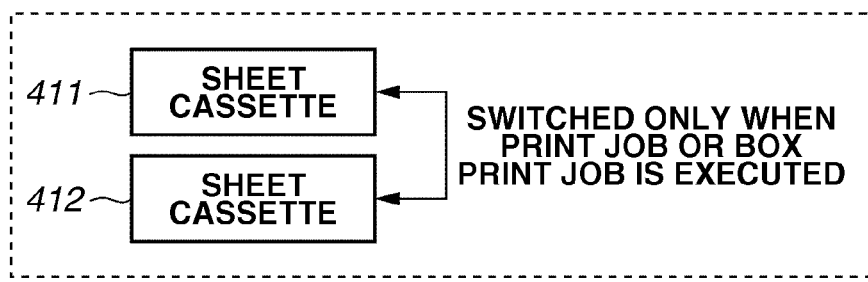
CONTROL OPERATION OF GROUP NUMBER 1
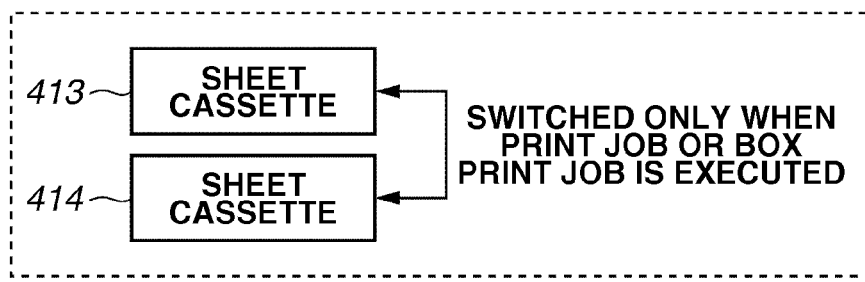
CONTROL OPERATION OF GROUP NUMBER 2
NO GROUP IS SPECIFIED

PRINTING APPARATUS, CONTROL METHOD FOR PRINTING APPARATUS, AND STORAGE MEDIUM

BACKGROUND OF THE INVENTION

1. Field of the Invention

The present invention relates to a printing apparatus capable of conveying a sheet from a storage unit, a control method for the printing apparatus, and a storage medium.

2. Description of the Related Art

Conventionally, there is a printing apparatus which has a function of specifying a certain storage unit (a sheet cassette or a sheet deck) to be used for printing. More specifically, when a job specifying a certain storage unit is received, such printing apparatus sets the specified storage unit as a storage unit to be used for the job, conveys a sheet from the storage unit, and prints an image on the conveyed sheet. With this function, for example, after accommodating sheets to be used for printing in a storage unit, a user can directly specify the storage unit and execute printing. However, if the printing apparatus detects running out of sheets in the specified storage unit, even if other storage units store usable sheets, the printing apparatus stops printing.

Japanese Patent Application Laid-Open No. 2009-256076 discusses a grouping function of registering two or more storage units as a group. When the printing apparatus discussed in Japanese Patent Application Laid-Open No. 2009-256076 detects running out of sheets in a storage unit used as the current sheet feed source during printing, the printing apparatus continues printing by changing the sheet feed source to another storage unit within the same group as the storage unit. In this way, the printing apparatus can continue printing even when the printing apparatus detects running out of sheets in a single storage unit.

However, according to the technique discussed in Japanese Patent Application Laid-Open No. 2009-256076, when the printing apparatus detects running out of sheets, the printing apparatus switches storage units within a group, irrespective of the type of the job being executed. Thus, when running out of sheets is detected, the printing apparatus cannot determine whether to switch storage units within a group based on the job type.

For example, depending on the usage environment of the printing apparatus, different operations may be executed. More specifically, a user may wish to switch storage units within a group when executing a print job transmitted from an external personal computer (PC), while the user may not wish to switch storage units when executing a copy job.

When a print job is executed, many pages are often printed. Thus, in such a case, if storage units are switched, printing can be executed more efficiently. In contrast, when a copy job is executed, a user may bring certain sheets to the printing apparatus, set the sheets in a storage unit, and input an instruction to print by specifying the storage unit. Thus, sheets in the storage unit are used. However, if the sheets in the storage unit run out and sheets in another storage unit are used, the type of the sheets used to the print product sheets is also changed in the middle of the job.

In such a case, whether to switch storage units in a group cannot be determined depending on the job type.

SUMMARY OF THE INVENTION

According to an aspect of the present invention a printing apparatus which is able to convey a sheet from any of a plurality of storage units includes a registering unit configured to register two or more storage units included in the plurality of storage units as one group, a setting unit configured to set a job type requiring switching of storage units within the two or more storage units included in the group registered by the registering unit, and a control unit configured to, in a case where a type of a received job is set by the setting unit with respect to a storage unit specified by the received job, in accordance with an amount of sheets in a storage unit used as a sheet conveyance source reaches a certain amount during execution of the job, perform control to continue printing by switching the sheet conveyance source to another storage unit which is registered by the registering unit as belonging to the same group as that of the storage unit specified by the job, and in a case where a type of a received job is not set by the setting unit with respect to a storage unit specified by the received job, in accordance with an amount of sheets in a storage unit used as the sheet conveyance source reaches a certain amount during execution of the job, perform control to stop printing without switching the sheet conveyance source to another storage unit which is registered by the registering unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A and 4B illustrate display screens according to an exemplary embodiment of the present invention.

FIG. 5 illustrates switch control operations of sheet cassettes according to an exemplary embodiment of the present invention.

FIG. 9 illustrates switch control operations of sheet cassettes according to an exemplary embodiment of the present invention.

FIG. 15 illustrates switch control operations of sheet cassettes according to an exemplary embodiment of the present invention.

DESCRIPTION OF THE EMBODIMENTS

Various exemplary embodiments, features, and aspects of the invention will be described in detail below with reference to the drawings.

A first exemplary embodiment will be described with reference to the drawings.

Figure 1:
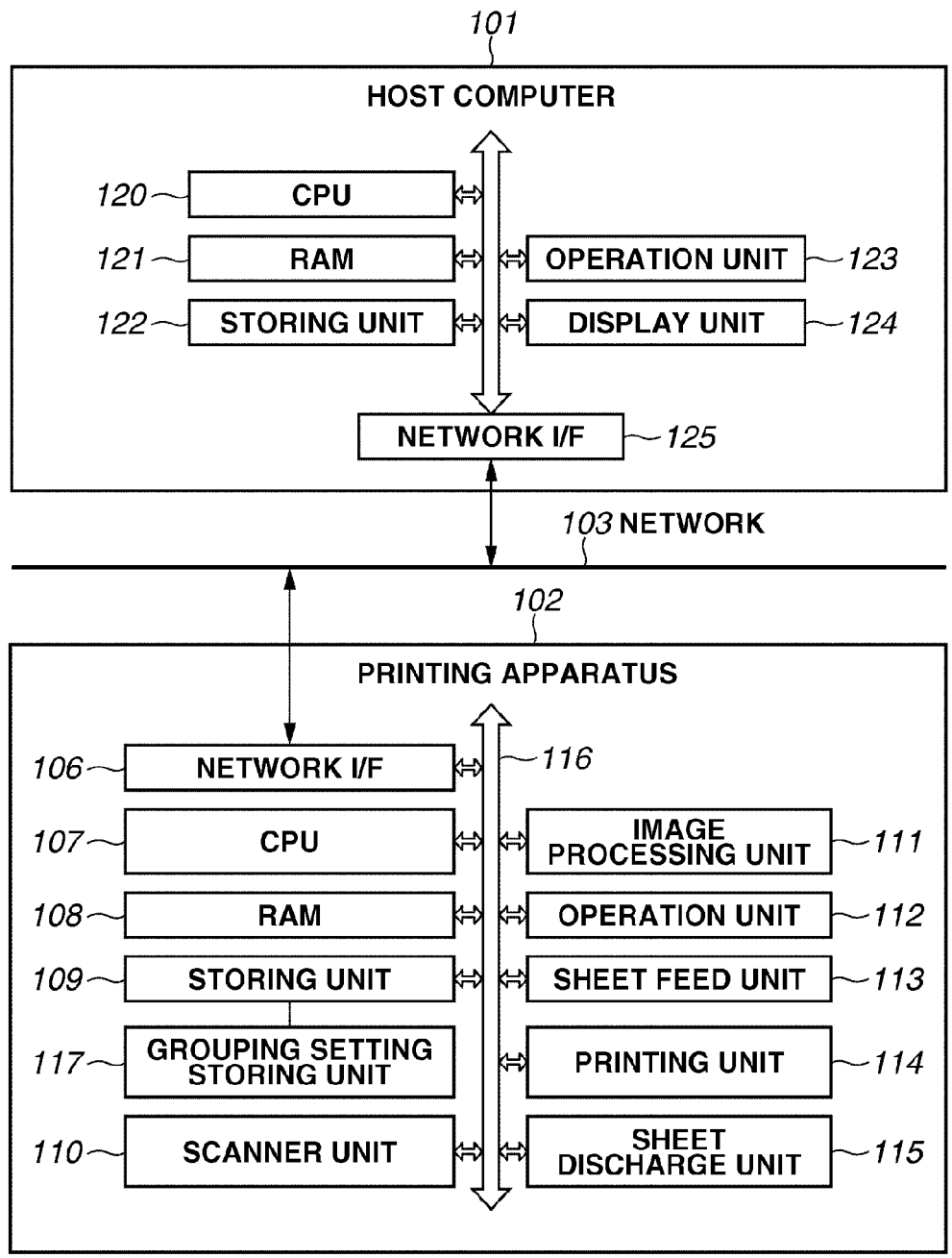
FIG. 1 illustrates a printing system according to an exemplary embodiment of the present invention.

FIG. 1 illustrates a printing system according to the first exemplary embodiment of the present invention.

The printing system includes a host computer 101 (hereinafter referred to as a PC 101) and a printing apparatus 102. The PC 101 is connected to the printing apparatus 102 via a network 103. According to the present exemplary embodiment, the printing apparatus 102 will be described as a multifunction peripheral (MFP) including a scanning function, a printing function, a facsimile (fax) function, and the like.

The PC 101 includes a central processing unit (CPU) 120, a random access memory (RAM) 121, a storing unit 122, an operation unit 123, a display unit 124, and a network interface (I/F) 125.

The CPU 120 comprehensively controls the PC 101, and the RAM 121 serves as a work area for the CPU 120. The storing unit 122 stores programs read by the CPU 120.

The operation unit 123 includes a keyboard and/or a mouse used when a user operates the PC 101. The display unit 124 displays an operation screen or a state of the PC 101.

The network I/F 125 controls data communication when the PC 101 communicates with other devices via the network 103.

Next, a configuration of the printing apparatus 102 will be described.

The printing apparatus 102 includes a CPU 107, a RAM 108, a storing unit 109, a grouping setting storing unit 117, a scanner unit 110, an image processing unit 111, an operation unit 112, a sheet feed unit 113, a printing unit 114, a sheet discharge unit 115, and a network I/F 106. These units are connected to each other via a system bus 116.

The CPU 107 comprehensively controls the printing apparatus 102, and the RAM 108 serves as a work area for the CPU 107. The storing unit 109 stores programs read by the CPU 107 and data relating to a print job received from the PC 101, for example. In addition, the storing unit 109 includes the grouping setting storing unit 117 for storing settings of sheet cassette groups.

The scanner unit 110 reads a document placed on a document positioning plate, generates image data from an image on the read document, and transfers the generated image data to the CPU 107. In addition, the scanner unit 110 includes an automatic document feeder (ADF). Thus, the scanner unit 110 can convey a plurality of documents stacked on the ADF one by one and can read an image on the conveyed document.

The image processing unit 111 processes a page description language (PDL) to generate image data, and transmits the generated image data to the storing unit 109 or the printing unit 114. The PDL is a language for describing commands for controlling a page printer, as typified by Post Script (PS) and Printer Control Language (PCL).

In addition, the image processing unit 111 processes an image on a document read by the scanner unit 110 or processes image data received by fax via a fax machine modem (not illustrated).

The operation unit 112 includes a liquid crystal display (LCD) unit to which a touch panel sheet is attached. The LCD unit displays an operation screen or a state of the printing apparatus 102. In addition, the operation unit 112 includes start and stop keys for receiving print start and stop instructions from a user, respectively.

The network I/F 106 controls data communication when the printing apparatus 102 communicates with other devices via the network 103.

The sheet feed unit 113 includes a plurality of sheet cassettes (also referred to as a storage unit, a sheet storage unit, or a sheet containing unit) and can feed (convey) sheets from any one of the sheet cassettes. Each of the plurality of sheet cassettes can store a plurality of sheets for printing. In accordance with a job attribute or information about the plurality of sheet cassettes, the CPU 107 determines a sheet feed source (conveyance source) and feeds sheets from a sheet cassette determined as the sheet feed source.

When a print command and image data are received from the CPU 107, the printing unit 114 prints an image on a sheet fed from the sheet cassette.

The sheet discharge unit 115 holds the sheet printed by the printing unit 114 until a user receives the sheet. The sheet discharge unit 115 may include a post-processing unit for stapling or trimming sheets. The printing system according to the present exemplary embodiment includes such a configuration as described above.

As described above, the printing apparatus 102 is an MFP and executes a copy job, a print job, a FAX job, a box print job, and the like.

A copy job is a job that the printing apparatus 102 causes the printing unit 114 to print a document image read by the scanner unit 110 on a sheet in accordance with a copy setting received via the operation unit 112. A print job is a job that the printing apparatus 102 receives a print setting and image data, received via the operation unit 123 of the PC 101, from the PC 101 via the network 103 and prints an image on a sheet in accordance with the received print setting and image data.

A fax job (i.e., a fax reception job) is a job that the printing apparatus 102 receives image data from another fax machine, MFP, or the like via a modem (not illustrated) and prints an image on a sheet in accordance with the received image data. A box print job is a job that the printing apparatus 102 prints an image on a sheet in accordance with a print setting received via the operation unit 112 and image data previously stored in the storing unit 109. As described above, the printing apparatus 102 can execute a plurality of types of jobs.

Figure 2:
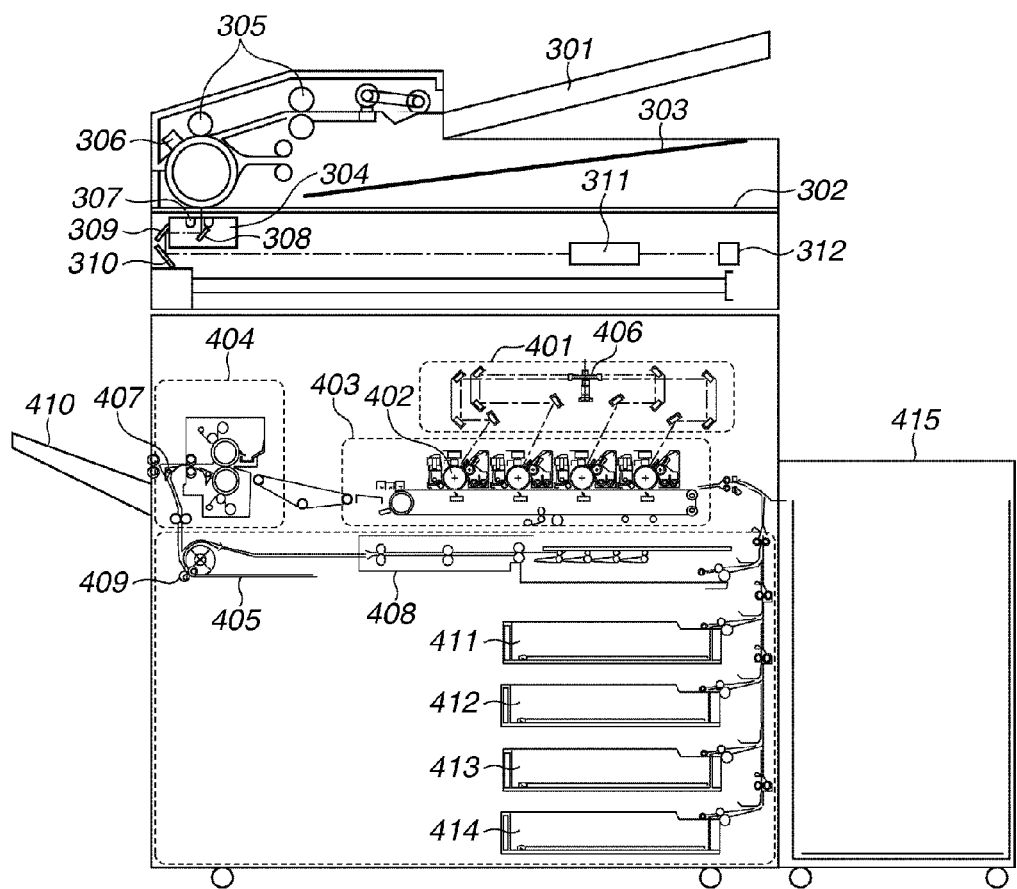
FIG. 2 illustrates a printing apparatus according to an exemplary embodiment of the present invention.

Next, the configuration of the printing apparatus 102 according to the present exemplary embodiment will be described in more detail with reference to FIG. 2. FIG. 2 is a cross section of the printing apparatus 102. The printing apparatus 102 includes a scanner unit and a printing unit.

In the scanner unit, documents stacked on an ADF 301 are sequentially conveyed to a document feeding-reading position in the stacking order one by one. Then, the conveyed document is scanned at the document feeding-reading position and is subsequently discharged to a discharge tray 303.

Along a conveyance path for guiding the document, conveyance rollers 305 driven by a stepping motor and a document detection sensor 306 for detecting the leading and trailing edges of the document are arranged.

The conveyance rollers 305 driven by the stepping motor cause each of the documents stacked on the ADF 301 to pass through the document feeding-reading position at a constant speed. In this operation, an optical unit 307 moves to the document feeding-reading position and illuminates the document being conveyed at the constant speed with a light source.

Reflected light from the document is guided to a charge-coupled device (CCD) image sensor (hereinafter referred to as CCD) 312 including a color separation filter via a plurality of mirrors 308 to 310 and a lens 311. In this way, colors of the scanned document image are separated and read by the CCD 312. By causing the CCD 312 to read the image as needed, image data per color (red (R), green (G), and blue (B)) is generated and transferred to the MFP control unit.

The printing unit includes four developing units that use toner of cyan (C), magenta (M), yellow (Y), and black (K), respectively, to form a color image or a monochrome image.

The printing unit includes a laser exposure unit 401, a rotating polygonal mirror (polygonal mirror) 406, photosensitive drums 402, an image forming unit 403, a fixing unit 404, a flapper 407, a reversing path 405, a roller 409, and a two-sided conveyance path 408. In addition, the printing unit includes sheet cassettes 411 to 415. The sheet cassette 415 is also referred to as a sheet deck.

In the laser exposure unit 401, a light beam such as laser light modulated depending on image data is incident on the rotating polygonal mirror (polygonal mirror) 406 that rotates at a constant angular velocity, and the photosensitive drums 402 are illuminated with the light as reflected scanning light.

In the image forming unit 403, the photosensitive drums 402 are driven to rotate and are charged by charging devices, and then the laser exposure unit 401 develops latent images formed on the respective photosensitive drums 402 with toners. The toner images are transferred to a print sheet, and some of the minute toner remaining on the photosensitive drums 402 without being transferred is collected. Thus, a series of electrophotographic processes can be realized by the image forming unit 403 including four developing units (developing stations).

The four developing units are arranged sequentially in the order of cyan (C), magenta (M), yellow (Y), and black (K). First, the cyan developing unit starts to form an image, and after the elapse of a predetermined period of time, the magenta, yellow, and black developing units sequentially start to form the respective images. With such timing control, a color image without color misregistration can be transferred on a print sheet.

The fixing unit 404 includes a combination of rollers and a belt and a heat source such as a halogen heater, to dissolve and fix the toner of the toner image transferred by the image forming unit 403 on the print sheet by heat and pressure.

Each of the sheet cassettes 411 to 415 stores sheets. In the printing apparatus 102, a sheet is fed from one of the sheet cassettes 411 to 415, and the fed sheet is conveyed to the image forming unit 403 by a conveyance belt. An image formed by the image forming unit 403 is transferred on the sheet conveyed in this way. The transferred image is then fixed on the sheet by the fixing unit 404.

When a sheet is discharged with a side on which an image is formed facing down (face-down discharge), the printing apparatus 102 causes the flapper 407 to guide the sheet to the reversing path 405 and discharges the reversed sheet onto the sheet discharge tray 410. In contrast, when a sheet is discharged with a side on which an image is formed facing up (face-up discharge), the printing apparatus 102 does not cause the flapper 407 to guide the sheet to the reversing path 405. Instead, the printing apparatus 102 discharges the sheet onto the sheet discharge tray 410.

When images are printed on the both sides of a sheet, the printing apparatus 102 causes the flapper 407 to guide the sheet to the reversing path 405 and causes the rollers 409 to pinch the trailing edge of the sheet and to guide the sheet to the two-sided conveyance path 408. After guided to the two-sided conveyance path 408, the sheet is conveyed to the image forming unit 403, again. The image forming unit 403 prints an image on the back side of the sheet. After an image is printed on the back side, the sheet is discharged onto the sheet discharge tray 410.

In this way, the printing apparatus 102 prints a color image on a sheet. In the case of printing a monochrome image on a sheet, the printing apparatus 102 drives only the black developing unit of the image forming unit 403 and prints an image on a sheet fed from one of the sheet cassettes 411 to 415 with the black toner.

Each of the sheet cassettes 411 to 415 includes a sheet detection sensor for detecting remaining sheets in the corresponding sheet cassette (in the corresponding storage unit). Based on signals from the sheet detection sensors, the CPU 107 grasps the remaining sheets in the respective sheet cassettes 411 to 415.

The printing apparatus 102 according to the present exemplary embodiment executes printing based on an electrophotographic method. However, the printing apparatus 102 may execute printing based on an ink-jet method.

Figure 3:
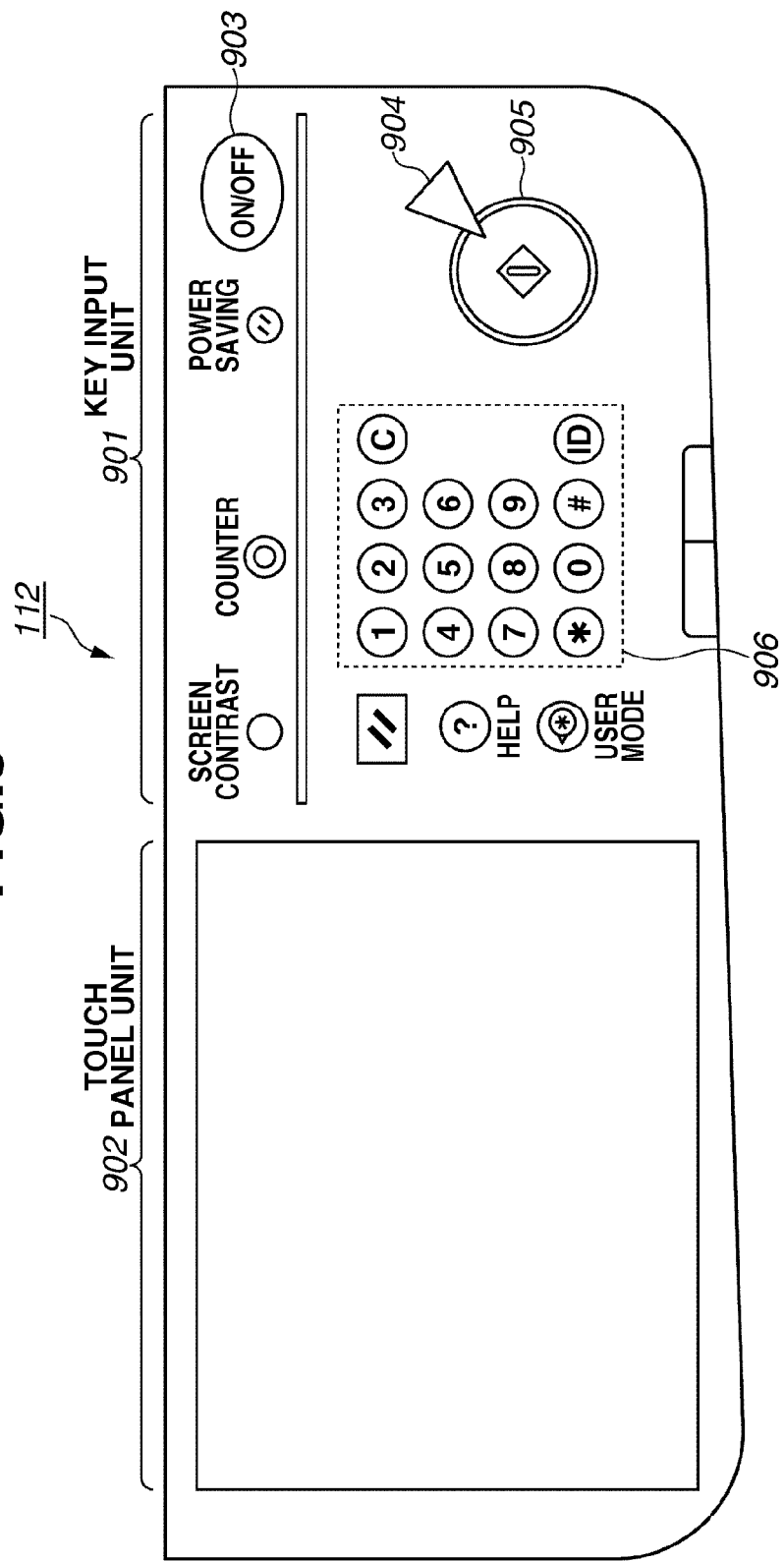
FIG. 3 illustrates an operation unit according to an exemplary embodiment of the present invention.

Next, the operation unit 112 of the printing apparatus 102 will be described with reference to FIG. 3.

The operation unit 112 includes a key input unit 901 for receiving user operations via hard keys and a touch panel unit 902 capable of displaying soft keys (display keys) and receiving user operations via the soft keys.

First, the key input unit 901 will be described. As illustrated in FIG. 3, the key input unit 901 includes an operation unit power supply switch 903. When the printing apparatus 102 is in a standby mode (a normal operation state), if a user presses the power supply switch 903, the CPU 107 switches the printing apparatus 102 from the standby mode to a sleep mode (a state in which power consumption is reduced). In contrast, when the printing apparatus 102 is in the sleep mode, if a user presses the power supply switch 903, the CPU 107 switches the printing apparatus 102 from the sleep mode to the standby mode.

A start key 905 is a key for receiving an instruction from a user to cause the printing apparatus 102 to execute a copy job or a box print job.

A stop key 904 is a key for receiving an instruction from a user to cancel a copy job or a box print job.

A numeric keypad 906 includes keys for allowing a user to input numbers for various settings.

Next, the touch panel unit 902 will be described. The touch panel unit 902 includes an LCD and a touch panel sheet including a transparent electrode attached on the LCD.

The touch panel unit 902 receives various settings from a user and displays information to a user.

Figure 13A:
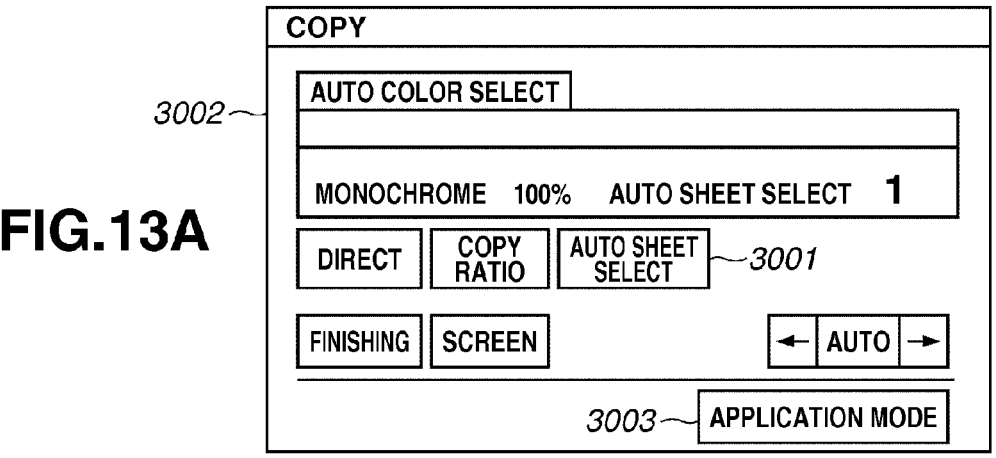
FIGS. 13A to 13C illustrate display screens according to an exemplary embodiment of the present invention.
Figure 13B:
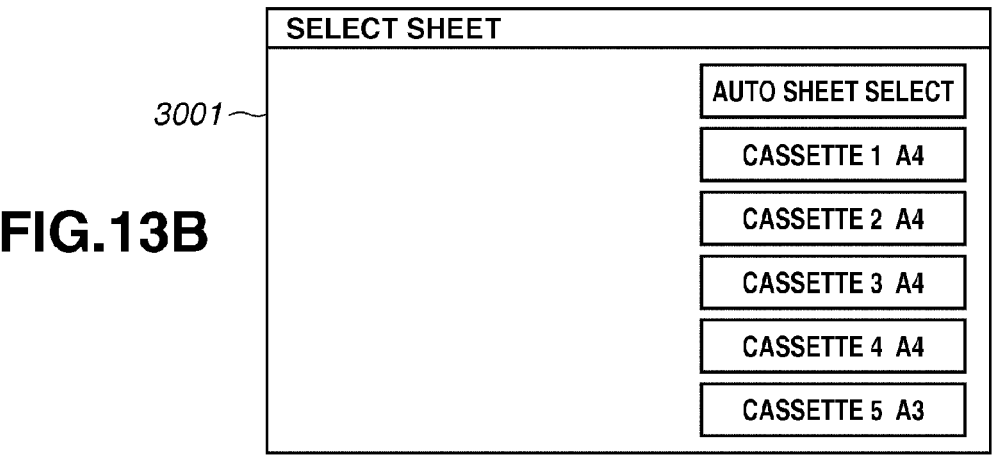
Figure 13C:
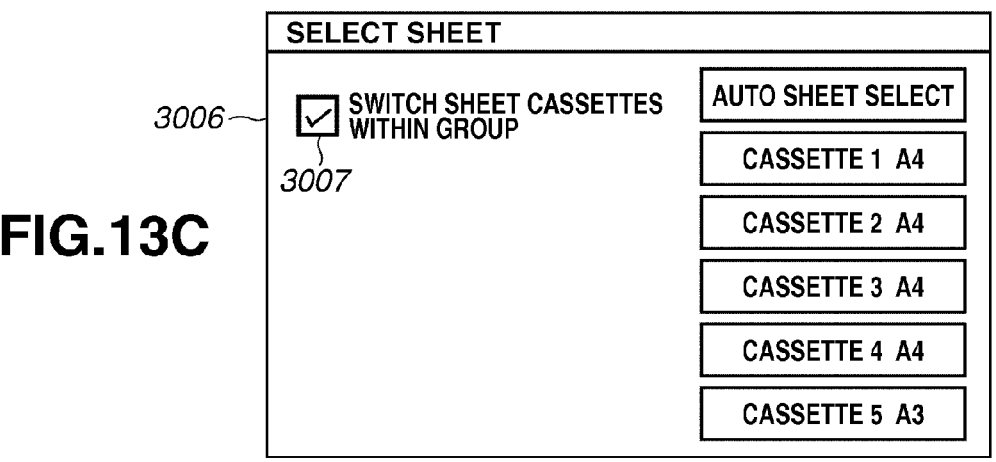

For example, screens illustrated in FIGS. 13A to 13C are displayed on the touch panel unit 902.

A screen 3002 illustrated in FIG. 13A is a copy function initial screen. When a button 3001 is pressed, a screen (illustrated in FIG. 13B) is displayed on which a user can select a sheet cassette to be used for printing.

An application mode button 3003 is used to display a screen (illustrated in FIG. 4A or 8A, for example) on which a user executes a sheet cassette setting. When the application mode button 3003 is pressed, a screen for a copy layout setting, a page print setting, or the like may be displayed, besides the screen for the sheet cassette setting.

The screen illustrated in FIG. 13B is displayed when the button 3001 is displayed, and on this screen, a user selects a sheet cassette to be used for printing of a copy job. The user selects a sheet cassette to be used for printing of a copy job via the screen in FIG. 13B.

If a user selects an "auto sheet select" button, the CPU 107 automatically selects a sheet cassette storing sheets corresponding to the document size. "Cassette 1" to "cassette 5" buttons are used for directly specifying a sheet cassette. "Cassette 1" to "cassette 5" correspond to the sheet cassettes 411 to 415, respectively. For example, if a user selects "cassette 3," the CPU 107 causes the storing unit 109 to store information indicating that the sheet cassette 413 is the sheet feed source of a copy job. Subsequently, if a user presses the start key 905, in accordance with the information stored in the storing unit 109, the CPU 107 causes the printing apparatus to feed a sheet from the sheet cassette 413 and to print the document image read by the scanner unit 110.

A screen illustrated in FIG. 13C is used for a control operation according to a third exemplary embodiment. Thus, this screen will be described in detail when the third exemplary embodiment is described below.

When the printing apparatus 102 including the above-described configuration detects running out of sheets included in a sheet cassette as the sheet feed source during printing, the printing apparatus 102 switches the sheet feed source to another sheet cassette. Thus, when the printing apparatus 102 detects running out of sheets set in a single sheet cassette, if another sheet cassette stores usable sheets, the printing apparatus 102 does not need to stop printing.

The printing apparatus 102 can define two or more of the sheet cassettes 411 to 415 as one group and can register a job type for the group. In addition, if the printing apparatus 102 detects running out of sheets in a sheet cassette specified by the job during execution of a job, the printing apparatus 102 determines whether the type of the job is registered for the sheet cassette specified by the job. If the printing apparatus 102 determines that the type of the job is registered, the printing apparatus 102 switches the sheet cassette as the sheet feed source to another sheet cassette within the group. If the printing apparatus 102 determines that the type of the job is not registered, the printing apparatus does not switch the sheet cassette and stops printing. A user can register a definition of such group via the operation unit 112 of the printing apparatus 102.

The grouping setting storing unit 117 stores information indicating the registered definition, and the CPU 107 can refer to the information as needed.

Next, a detailed control operation of the printing apparatus 102 for realizing such function will be described.

FIGS. 4A and 4B illustrate screens for setting the sheet cassettes according to the present exemplary embodiment.

The operation unit 112 displays a screen 501 when a user presses the application mode button 3003 on the screen 3002 in FIG. 13A. Alternatively, the printing apparatus 102 may be configured to enable a user to set a group of sheet cassettes from the PC 101. In such case, the screen 501 is displayed on the operation unit 123 of the PC 101.

On the screen 501 in FIG. 4A, the sheet cassettes have already been grouped. In FIG. 4A, sheet cassette information 502, 503, 504, 505, and 506 corresponds to the sheet cassettes 411, 412, 413, 414, and 415, respectively.

In FIG. 4A, the sheet cassette information 502 indicates that the sheet cassette 411 stores A4-size plain paper, and the corresponding group information indicates that the sheet cassette 411 belongs to G1 (group 1).

In addition, the sheet cassette information 503 indicates that the sheet cassette 412 stores A4-size plain paper, and the corresponding group information indicates that the sheet cassette 412 belongs to the same group G1 as the sheet cassette 411. Checks in a check box 512 indicate that the group G1 is set to be used only for a copy job. Checks in the check box 512 are given in accordance with the groups indicated by the group information.

For example, if the "COPY" check box of the sheet cassette information 502 is changed from OFF to ON, the "COPY" check box of the sheet cassette information 503 belonging to the same group as the sheet cassette information 502 is also changed from OFF to ON. The same applies to the "PRINT" and "BOX PRINT" check boxes. In addition, the same applies to when a check box is changed from ON to OFF. In addition, among a plurality of sheet cassettes that is set to ON, if a certain sheet cassette group is changed, the settings of check boxes (COPY, PRINT, and BOX PRINT) of the sheet cassettes are matched to the settings of check boxes of the sheet cassettes of the changed group.

Further in FIG. 4, the sheet cassette information 504 indicates that the sheet cassette 413 stores A4-size plain paper, and the corresponding group information indicates that the sheet cassette 413 belongs to G2 (group 2) different from that of the sheet cassettes 411 and 412.

In addition, the sheet cassette information 505 indicates that the sheet cassette 414 stores A4-size plain paper, and the corresponding group information indicates that the sheet cassette 414 belongs to the same group G2 as the sheet cassette 413. The checks in the check box 512 indicate that the group G2 is set to be used only for a print job. These checks in the check box 512 are also given in accordance with the groups indicated by the group information.

Finally, the sheet cassette information 506 indicates that the sheet cassette 415 stores A3-size recycled paper, and the corresponding group information indicates that the sheet cassette 415 does not belong to any group.

An OK key 507 is a key for fixing the information set on the screen 501.

When a user selects any sheet cassette information or group information on the screen 501 via the touch panel, the operation unit 112 displays a screen 508 illustrated in FIG. 4B. The user can change information about the corresponding sheet cassette on the screen 508. Alternatively, the printing apparatus 102 may be configured to enable a user to change the sheet cassette information from the PC 101. In such case, the screen 508 is displayed on the operation unit 123 of the PC 101.

In the example illustrated in FIG. 4B, the sheet cassette information and the group information of the sheet cassette 413 are displayed. In FIG. 4B, a sheet size 509 and a sheet type 510 are indicated as the sheet cassette information, and a group number 511 is indicated as the group information.

If a user wishes to change the setting content of one of these items, the user touches the corresponding item on this screen.

For example, the user touches the sheet size 509 and sets the sheet size (A4-size, A3-size, letter size, or the like) of sheets stored in the sheet cassette 412 in the printing apparatus 102. Various sheet size options may be displayed in the form of a pull-down menu or in the form of a pop-up menu so that the user can select a desired sheet size.

If a user wishes to change the sheet type 510, the user specifies the sheet type 510 and sets the sheet type (plain paper, recycled paper, coated paper, thick paper, or the like) of sheets stored in the sheet cassette 413 in the printing apparatus 102. As in the case of the sheet size, various sheet type options may be displayed in the form of a pull-down menu or in the form of a pop-up menu so that the user can select a desired sheet type.

If a user wishes to change the group number 511, the user specifies the group number 511 and sets an arbitrary group number.

After setting the sheet size 509, the sheet type 510, and the group number 511, the user selects an OK key 513. When the OK key 513 is selected, the CPU 107 stores the set values in the grouping setting storing unit 117 and displays the sheet cassette setting screen 501 on the operation unit 112.

On the other hand, if the user does not wish to store the values set for the sheet size 509, the sheet type 510, and the group number 511, the user selects a cancel key 514. If the cancel key 514 is pressed, the CPU 107 displays the sheet cassette setting screen 501 without storing the setting values in the grouping setting storing unit 117. Finally, if the OK key 507 is pressed, the CPU 107 stores the values set in the check box 512 in the grouping setting storing unit 117, hides the sheet cassette setting screen 501, and displays the screen illustrated in FIG. 13A on the operation unit 112. In this way, the sheet cassette setting is executed.

FIG. 5 illustrates grouping settings defined for a plurality of sheet cassettes according to the present exemplary embodiment of the present invention.

In the setting of group number 1 in FIG. 5, the sheet cassettes 411 and 412 are set as one group (G1). With this setting, in the case of running out of sheets, the CPU 107 switches the sheet cassettes 411 and 412 within the group only when a copy job is executed.

In this case, if the CPU 107 detects running out of sheets in the sheet cassette 411 during a copy job which specifies to use the sheet cassette 411, the CPU 107 switches the sheet feed source to the sheet cassette 412 and continues printing.

Alternatively, if the CPU 107 detects running out of sheets in the sheet cassette 412 during a copy job which specifies to use the sheet cassette 412, the CPU 107 switches the sheet feed source to the sheet cassette 411 and continues printing.

In contrast, in the case that the CPU 107 executes a print job which specifies to use the sheet cassette 411, if the sheets in the sheet cassette 411 run out, the CPU 107 notifies a user of an error message without switching the sheet feed source. The same applies to when the CPU 107 executes a print job which specifies to use the sheet cassette 412. If the sheets in the sheet cassette 412 run out, the CPU 107 notifies a user of an error message without switching the sheet feed source. In other words, the grouping function is applied only when the CPU 107 executes a copy job specifying to use the sheet cassette 411 or 412.

In the setting of group number 2 in FIG. 5, the sheet cassettes 413 and 414 are set as one group (G2). With this setting, only when the CPU 107 executes a print job, the CPU 107 switches the sheet cassettes 413 and 414 within the group in the case of running out of sheets.

In this case, if the CPU 107 detects running out of sheets in the sheet cassette 413 during a print job which specifies to use the sheet cassette 413, the CPU 107 switches the sheet feed source to the sheet cassette 414 and continues printing.

Alternatively, if the CPU 107 detects running out of sheets in the sheet cassette 414 during a print job which specifies to use the sheet cassette 414, the CPU 107 switches the sheet feed source to the sheet cassette 413 and continues printing.

However, if the CPU 107 detects running out of sheets in the sheet cassette 415 during a job which specifies to use the sheet cassette 415, the CPU 107 does not switch the sheet cassette used as the sheet feed source. This is because the sheet cassette 415 does not belong to any group.

Thus, when a sheet cassette to be used is specified by a received job and the type of the received job is set with respect to the sheet cassette, the CPU 107 can switch storage units within the group in the case of running out of sheets. In this way, stoppage of printing due to running out of sheets can be prevented. Further, even when the CPU 107 detects running out of sheets, the CPU 107 does not switch the sheet feed source to any sheet cassette that does not belong to the same group as the sheet cassette specified by the received job. Thus, no sheets are fed from such sheet cassette. Furthermore, if the sheets run out during execution of a job of an unintended type, the CPU 107 does not switch the sheet cassette. Thus, when executing a job of an unintended type, the printing apparatus 102 can avoid using any other sheet cassette different from the specified sheet cassette.

In the case where sheets in a sheet cassette run out and there is a plurality of options as a new sheet feed source, the CPU 107 performs control to preferentially select a sheet cassette closest to the image forming unit 403 as the new sheet feed source.

Figure 6:
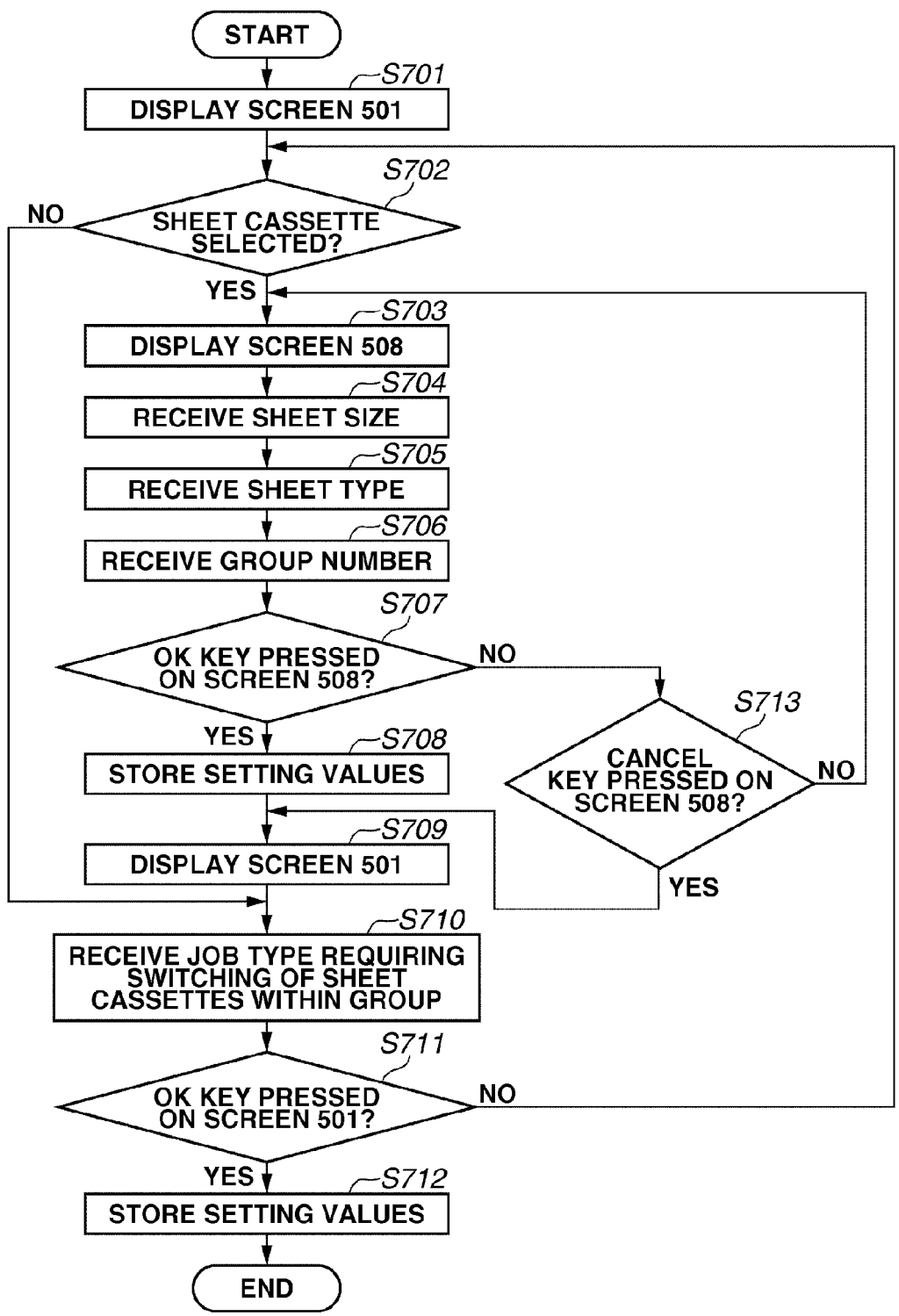
FIG. 6 is a flow chart illustrating a process according to an exemplary embodiment of the present invention.

FIG. 6 is a flow chart illustrating a sheet cassette registration procedure according to the present exemplary embodiment. The process illustrated in the present flow chart is executed by the CPU 107 reading a program stored in the storing unit 109 to the RAM 108 and executing the program.

The CPU 107 starts the process illustrated in the flow chart in FIG. 6 when the sheet cassette setting screen 501 is called via the operation unit 112 of the printing apparatus 102.

First, in step S701, the CPU 107 displays the sheet cassette setting screen 501 on the operation unit 112.

In step S702, the CPU 107 receives a selection of a sheet cassette via the sheet cassette setting screen 501. If a sheet cassette is selected (YES in step S702), the CPU 107 advances the process to step S703. If not (NO in step S702), the CPU 107 advances the process to step S710.

In step S703, the CPU 107 displays the screen 508 on the operation unit 112.

In step S704, the CPU 107 receives a size of sheets stored in the sheet cassette selected in step S701 via the screen 508.

In step S705, the CPU 107 receives a type of the sheets stored in the sheet cassette selected in step S701 via the screen 508.

In step S706, the CPU 107 receives a group number set for the sheet cassette selected in step S701 via the screen 508. The CPU 107 may receive the settings in steps S704 to S706 in a different order.

In step S707, the CPU 107 determines whether the OK key 513 on the screen 508 is pressed. If the OK key 513 is pressed (YES in S707), the CPU 107 advances the process to step S708. In step S708, the CPU 107 stores the received setting values in the grouping setting storing unit 117 as the sheet cassette setting and advances the process to step S709. However, if the OK key 513 is not pressed (NO in step S707), the CPU 107 advances the process to step S713. In step S713, the CPU 107 determines whether the cancel key 514 is pressed on the screen 508. If the CPU 107 determines that the cancel key 514 is pressed (YES in step S713), the CPU 107 advances the process to step S709 without storing the received setting values in the grouping setting storing unit 117.

In step S709, the CPU 107 displays the screen 501 on the operation unit 112. In step S710, via the screen 501, the CPU 107 receives a job type requiring switching of the sheet feed source within a sheet cassette group when the sheets run out. As the job type, the user can select a print job, a copy job, or a box print job for each sheet cassette. The CPU 107 stores the settings received in steps S704 to S706 and step S708 in the storing unit 109.

In step S711, the CPU 107 determines whether the OK key 507 is pressed on the screen 501. If the CPU 107 determines that the OK key 507 is pressed (YES in step S711), the CPU 107 advances the process to step S712. In step S712, the CPU 107 stores the setting values received in step S710, hides the screen 501, and ends the process in the flow chart in FIG. 6. At that time, the copy function initial screen illustrated in FIG. 13A is displayed on the operation unit 112.

In step S711, if the CPU 107 determines that the OK key 507 is not pressed (NO in step S711), the CPU 107 returns the process to step S702 and waits for selection of a sheet cassette again.

In this way, the sheet cassette setting is registered in the grouping setting storing unit 117.

Figure 7:
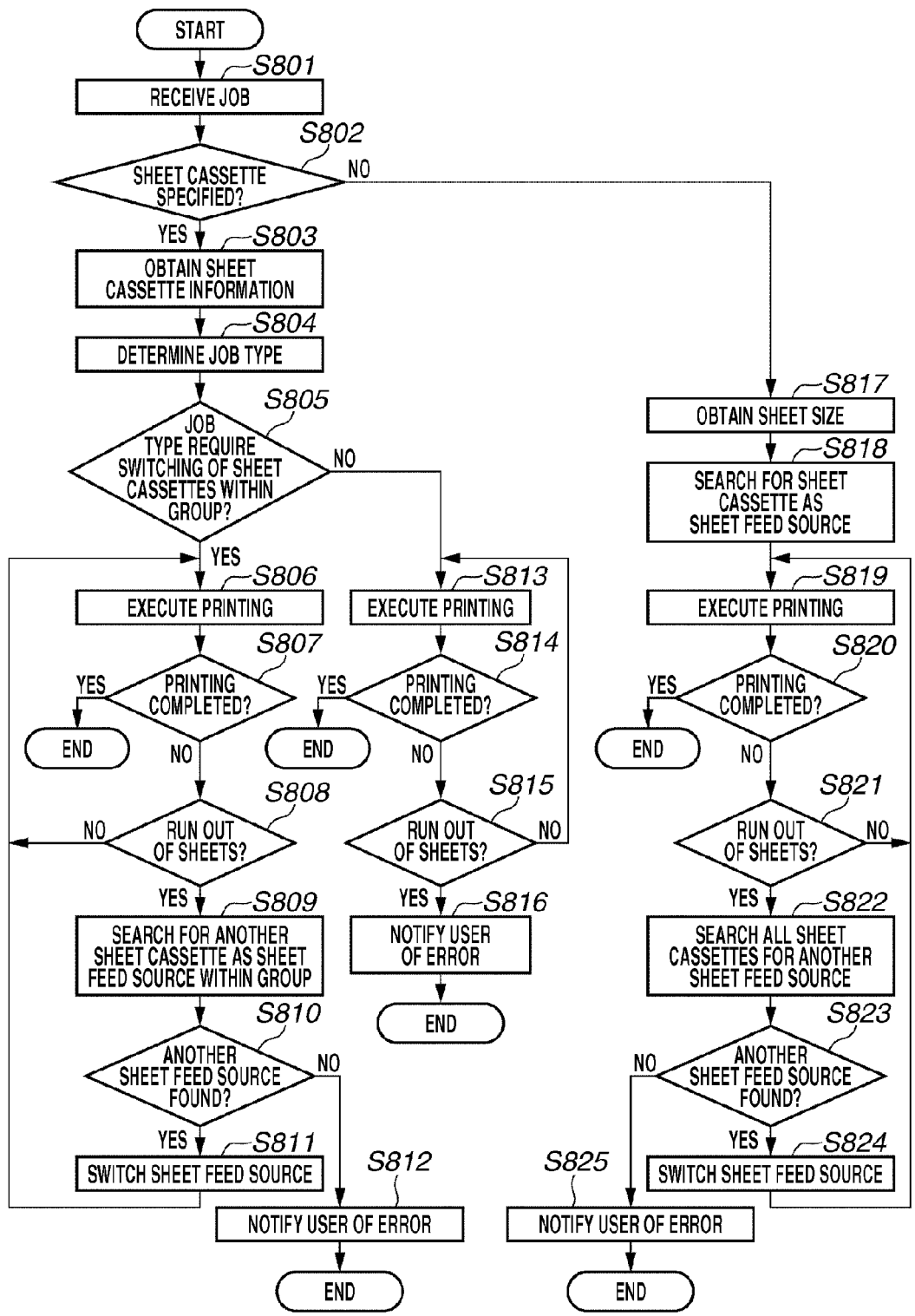
FIG. 7 is a flow chart illustrating a process according to an exemplary embodiment of the present invention.

FIG. 7 is a flow chart illustrating a procedure for processing a job according to the present exemplary embodiment. The process illustrated in the present flow chart is executed by the CPU 107 reading a program stored in the storing unit 109 to the RAM 108 and executing the program.

First, in step S801, the CPU 107 receives a job. Examples of the job include the above-described copy job, print job, and box print job.

In step S802, the CPU 107 analyzes the received job and determines whether the job specifies a certain sheet cassette. In the case of a copy job or a box print job, a certain sheet cassette can be specified by pressing the "cassette 1" to "cassette 5" buttons on the screen in FIG. 13B displayed on the operation unit 112. In the case of a print job, a certain sheet cassette can be specified on a screen which has functions similar to those in FIG. 13B and is displayed on the operation unit 123 of the PC 101. If the CPU 107 determines that the received job specifies a certain sheet cassette (YES in step S802), the CPU 107 advances the process to step S803. If not (NO in step S802), the CPU 107 advances the process to step S817.

In step S803, the CPU 107 obtains the sheet cassette information stored in the grouping setting storing unit 117.

In step S804, the CPU 107 determines the type of the received job. For example, the CPU 107 determines whether the received job is a copy job, a print job, or a box print job.

In step S805, the CPU 107 determines whether the sheet cassette specified by the received job is associated with the job type (the job type determined in step S804). If the CPU 107 determines that the sheet cassette specified by the received job is associated with the job type determined in step S804 (YES in step S805), the CPU 107 advances the process to step S806. In contrast, if the CPU 107 determines that the sheet cassette specified by the received job is not associated with the job type determined in step S804 (NO in step S805), the CPU 107 advances the process to step S813.

In step S806, the CPU 107 executes printing. In step S806, the CPU 107 controls the sheet cassette specified by the job to feed a sheet and controls the printing unit 114 to print an image on the fed sheet.

In step S807, the CPU 107 determines whether printing is completed. If the CPU 107 determines that printing is completed (YES in step S807), the CPU 107 ends the process. If not (NO in step S807), the CPU 107 advances the process to step S808.

In step S808, the CPU 107 determines whether sheets in the sheet cassette as the sheet feed source run out based on a signal from the above-described sheet detection sensor. The CPU 107 can determine as running out of sheets when the number of remaining sheets in the sheet cassette reaches zero.

In step S808, if the CPU 107 determines as running out of sheets (YES in step S808), the CPU 107 advances the process to step S809. If not (NO in step S808), the CPU 107 returns the process to step S806 and continues printing.

In step S809, the CPU 107 refers to the grouping setting storing unit 117 to determine whether there is another sheet cassette storing sheets within the same group to which the sheet cassette that has been used belongs.

In step S810, if the CPU 107 determines whether another sheet cassette has been found. If another sheet cassette has been found (YES in step S810), the CPU 107 advances the process to step S811. In step S811, the CPU 107 switches the sheet feed source to the new sheet cassette that has been found, and then advances the process to step S806 to continue printing. On the other hand, if another sheet cassette has not been found (NO in step S810), the CPU 107 advances the process from step S810 to step S812. In step S812, the CPU 107 displays a message "replenish sheets in the sheet cassette" on the operation unit 112 and ends the process.

If the process proceeds from step S805 to step S813, in step S813, the CPU 107 controls the sheet cassette specified by the job to feed a sheet and controls the printing unit 114 to print an image on the fed sheet.

In step S814, the CPU 107 determines whether printing is completed. If the CPU 107 determines that printing is completed (YES in step S814), the CPU 107 ends the process. If not (NO in step S814), the CPU 107 advances the process to step S815.

In step S815, the CPU 107 determines whether sheets in the sheet cassette as the sheet feed source run out based on a signal from the above-described sheet detection sensor. The CPU 107 can determine as running out of sheets when the number of remaining sheets in the sheet cassette reaches zero.

In step S816, the CPU 107 displays a message "replenish sheets in the sheet cassette" on the operation unit 112 and ends the process.

If the process proceeds from step S802 to step S817, in step S817, the CPU 107 analyzes the job and obtains a sheet size specified by the job.

In step S818, the CPU 107 refers to the sheet cassette information set in the grouping setting storing unit 117 and searches for a sheet cassette to be the sheet feed source. In this step, the CPU 107 identifies the sheet size specified by the job and searches for a sheet cassette storing the identified size sheet.

In step S819, the CPU 107 controls the sheet cassette found as a result of the search to feed a sheet and controls the printing unit 114 to print an image on the fed sheet.

In step S820, the CPU 107 determines whether printing is completed. If the CPU 107 determines that printing is completed (YES in step S820), the CPU 107 ends the process. If not (NO in step S820), the CPU 107 advances the process to step S821.

In step S821, the CPU 107 determines whether sheets in the sheet cassette as the sheet feed source run out based on a signal from the above-described sheet detection sensor. The CPU 107 can determine as running out of sheets when the number of remaining sheets in the sheet cassette reaches zero.

In step S821, if the CPU 107 determines as running out of sheets (YES in step S821), the CPU 107 advances the process to step S822. If not (NO in step S821), the CPU 107 continues printing.

In step S822, the CPU 107 searches all the sheet cassettes included in the printing apparatus 102 for another sheet cassette storing the sheet size specified by the job.

In step S823, the CPU 107 determines whether another sheet cassette has been found. If another sheet cassette has been found (YES in step S823), the CPU 107 advances the process to step S824. If not (NO in step S823), the CPU 107 advances the process to step S825. In step S825, the CPU 107 displays a message "replenish sheets in the sheet cassette" on the operation unit 112 and ends the process.

According to the above-described control, when a plurality of sheet cassettes included in the printing apparatus 102 is grouped, whether to switch sheet cassettes within the group in the case of running out of sheets can be determined according to the job type. Thus, for example, when a job of a first type is executed, stoppage of printing due to running out of sheets can be prevented, and when a job of a second type is executed, the printing apparatus 102 can execute printing by feeding sheets only from a sheet cassette specified by the job.

In steps S807, S814, and S819, the CPU 107 determines as running out of sheets if the number of remaining sheets in the sheet cassette reaches zero. However, the present invention is not limited to such example. For example, the CPU 107 may determine as running out of sheets if the number of remaining sheets in the sheet cassette falls below a certain amount, instead of zero.

In the first exemplary embodiment, an example is described in which the CPU 107 determines whether to switch sheet cassettes within a group based on a job type set in a sheet cassette in the case of running out of sheets.

In a second exemplary embodiment, an example is described in which the CPU 107 determines whether to switch sheet cassettes within a group based on a language type used by a print job in the case of running out of sheets. In the present exemplary embodiment, only differences from the first exemplary embodiments will be described, and redundant description will be avoided.

Examples of the language type used by a print job include Post Script (PS), Printer Command Language (PCL), Laser beam printer Image Processing System (LIPS), Epson Standard Code for Page printer (ESC/Page), and the like. These languages are general-purpose PDLs. In addition to such general-purpose PDLs, non general-purpose PDLs may also be used.

Among these languages, there is a language suitable for printing a large number of pages. For example, PS is suitable for printing a large number of pages. Thus, when a certain sheet cassette is specified by a job described in such language, if a grouping function is applied, a large number of pages can be printed efficiently.

According to the present exemplary embodiment, an example is described in which, when a print job described in the PS language is executed, the CPU 107 switches sheet cassettes within a group in the case of running out of sheets. However, according to the usage environment of the printing apparatus 102, PS may not be supported by the PC 101. In consideration of such case, the printing apparatus 102 is configured to allow a user to change the language used as a condition to switch sheet cassettes within a group in the case of running out of sheets.

The present exemplary embodiment will be described in detail below with reference to the drawings.

Figure 8:
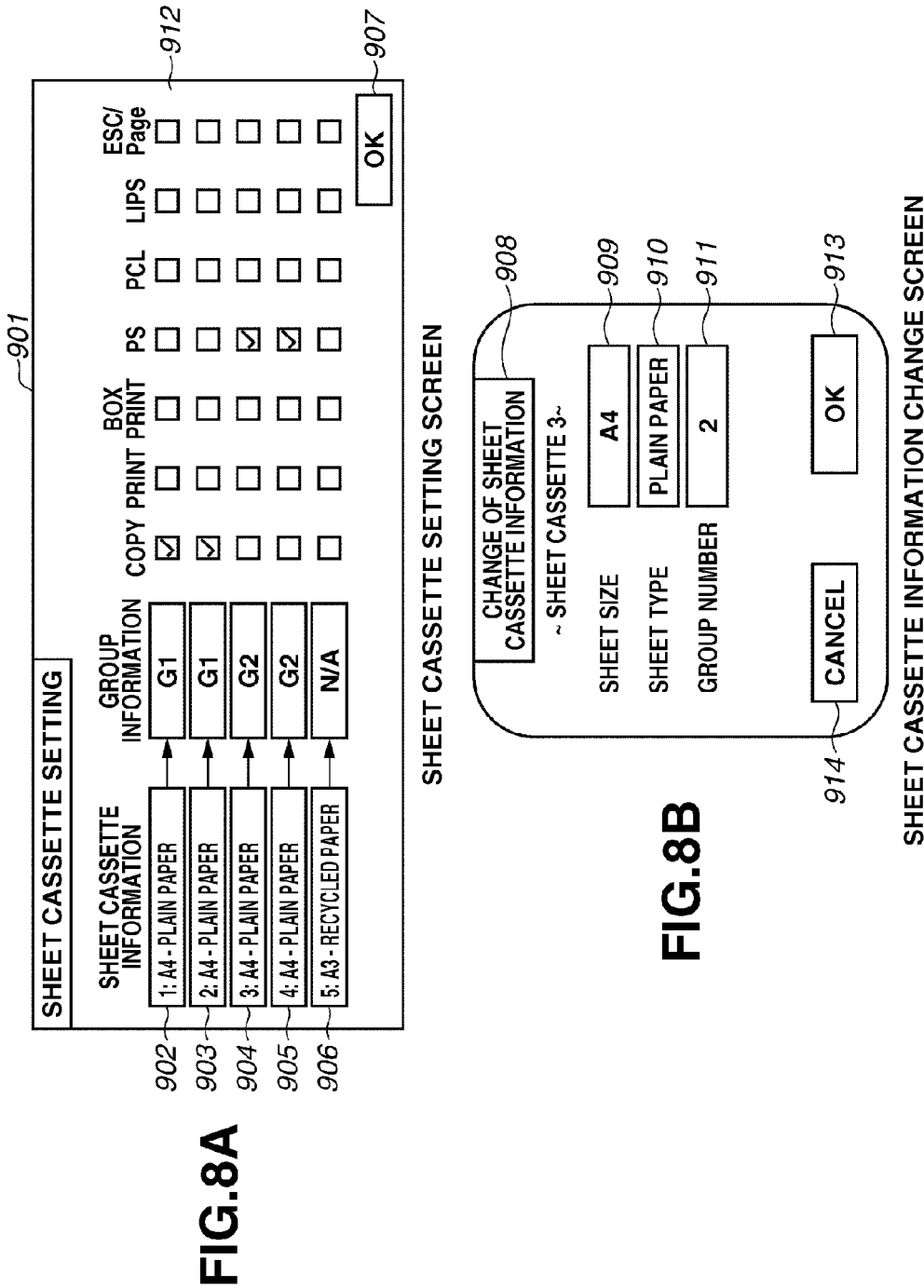
FIGS. 8A and 8B illustrate display screens according to an exemplary embodiment of the present invention.

FIGS. 8A and 8B illustrate screens for executing a sheet cassette setting according to the present exemplary embodiment. A screen 901 in FIG. 8A is displayed on the operation unit 112 of the printing apparatus 102. Alternatively, the printing apparatus 102 may be configured to enable a user to set a group of sheet cassettes from the PC 101. In such case, the screen 901 is displayed on the operation unit 123 of the PC 101.

On the screen 901, the sheet cassettes have already been grouped. In this example, sheet cassette information 902, 903, 904, 905, and 906 corresponds to the sheet cassettes 411, 412, 413, 414, and 415, respectively.

In FIG. 8A, the sheet cassette information 902 indicates that the sheet cassette 411 stores A4-size plain paper, and the corresponding group information indicates that the sheet cassette 411 belongs to G1 (group 1).

In addition, the sheet cassette information 903 indicates that the sheet cassette 412 stores A4-size plain paper, and the corresponding group information indicates that the sheet cassette 412 belongs to the same group G1 as the sheet cassette 411. Checks in a check box 912 indicate that the group G1 is set to be used only for a copy job.

Checks in the check box 912 are given in accordance with the groups indicated by the group information. In addition to the copy job, fax job, box print job, etc., examples of the applicable job type that can be set in the check box 912 include PS, PCL, LIPS, and ESC/Page. As described above, these PS, PCL, LIPS, and ESC/Page are language types to be used by a print job.

The sheet cassette information 904 indicates that the sheet cassette 413 stores A4-size plain paper, and the corresponding group information indicates that the sheet cassette 413 belongs to G2 (group 2) different from that of the sheet cassettes 411 and 412. The screen 901 displays that the group G2 is used only for a print job described in the PS language.

In other words, when the CPU 107 executes a print job, if the print job is described in PCL, LIPS, or ESC/Page the CPU 107 does not switch the sheet cassette within the group in the case of running out of sheets even if the print job specifies the sheet cassette 904. In addition, when the CPU 107 executes a print job described in a non general-purpose PDL, even if the print job specifies the sheet cassette 904, the CPU 107 does not switch the sheet cassette within the group in the case of running out of sheets.

The sheet cassette information 905 indicates that the sheet cassette 414 stores A4-size plain paper, and the corresponding group information indicates that the sheet cassette 414 belongs to the same group G2 as the sheet cassette 413. As in the case of the sheet cassette information 904, the check box 912 indicates that the group G2 is used only for a print job described in the PS language.

Finally, the sheet cassette information 906 indicates that the sheet cassette 415 stores A3-size recycled paper, and the corresponding group information indicates that the sheet cassette 415 does not belong to any group.

An OK key 907 is a key for confirming the information set on the screen 901.

When a user selects any sheet cassette information or group information on the screen 901 via the touch panel, the operation unit 112 displays a screen 908 illustrated in FIG. 8B. The user can change information about the corresponding sheet cassette on this screen 908. Alternatively, the printing apparatus 102 may be configured to enable a user to change the sheet cassette information from the PC 101. In such case, the screen 908 is displayed on the operation unit 123 of the PC 101.

In the example illustrated in FIG. 8B, the sheet cassette information and the group information of the sheet cassette 413 are displayed. In FIG. 8B, a sheet size 909 and a sheet type 910 are indicated as the sheet cassette information, and a group number 911 is indicated as the group information.

If a user wishes to change the setting content of one of these items, the user specifies the corresponding item on this screen. For example, if the user wishes to change the sheet size 909, the user specifies the sheet size 909 and sets the sheet size (A4-size, A3-size, letter size, or the like) of sheets stored in the sheet cassette 412 in the printing apparatus 102. Various sheet size options may be displayed in the form of a pull-down menu or in the form of a pop-up menu so that the user can select a desired sheet size.

If a user wishes to change the sheet type 910, the user specifies the sheet type 910 and sets the sheet type (plain paper, recycled paper, coated paper, thick paper, or the like) of sheets that can be stored in the sheet cassette 412 in the printing apparatus 102. As in the case of the sheet size, various sheet type options may be displayed in the form of a pull-down menu or in the form of a pop-up menu so that the user can select a desired sheet type.

If a user wishes to change the group number 911, the user specifies the group number 911 and sets an arbitrary group number.

After setting the sheet size 909, the sheet type 910, and the group number 911, the user selects an OK key 913. When the OK key 913 is selected, the CPU 107 stores the set values in the grouping setting storing unit 117 and displays the sheet cassette setting screen 901 on the operation unit 112.

On the other hand, if the user does not wish to store the values set for the sheet size 909, the sheet type 910, and the group number 911, the user selects a cancel key 914. If the cancel key 914 is pressed, the CPU 107 displays the sheet cassette setting screen 901 without storing the setting values in the grouping setting storing unit 117.

Finally, if the OK key 907 is pressed, the CPU 107 stores the values set in the check box 912 in the grouping setting storing unit 117, hides the sheet cassette setting screen 901, and ends the sheet cassette setting.

FIG. 9 illustrates grouping settings defined for a plurality of sheet cassettes according to the present exemplary embodiment of the present invention.

In the setting of group number 1 in FIG. 9, the sheet cassettes 411 and 412 are set as one group (G1). In addition, the grouping setting is set to be applied only when the CPU 107 executes a copy job.

In this setting, if the CPU 107 detects running out of sheets in the sheet cassette 411 during a copy job which specifies to use the sheet cassette 411, the CPU 107 switches the sheet feed source to the sheet cassette 412 and continues printing.

Alternatively, if the CPU 107 detects running out of sheets in the sheet cassette 412 during a copy job which specifies to use the sheet cassette 412, the CPU 107 switches the sheet feed source to the sheet cassette 411 and continues printing.

In contrast, in the case that the CPU 107 executes a print job which specifies to use the sheet cassette 411, if the sheets in the sheet cassette 411 run out, the CPU 107 notifies a user of an error message without switching the sheet feed source.

The same applies to when the CPU 107 executes a print job which specifies to use the sheet cassette 412. If the sheets in the sheet cassette 412 run out, the CPU 107 notifies a user of an error message without switching the sheet feed source. Namely, in the case that a job specifying to use the sheet cassette 411 or 412 is executed, the CPU 107 performs control to switch the sheet feed source within the same group only when a copy job is executed.

In the setting of group number 2 in FIG. 9, the sheet cassettes 413 and 414 are set as one group (G2). In this setting, the grouping function is set to be applied only when the CPU 107 executes a print job described in PS.

In this setting, when the sheet cassette 413 is specified by a print job described in PS and if the CPU 107 detects running out of sheets in the sheet cassette 413 during the print job, the CPU 107 switches the sheet feed source to the sheet cassette 414 and continues printing.

Similarly, when the sheet cassette 414 is specified by a print job described in PS and if the CPU 107 detects running out of sheets in the sheet cassette 414 during the print job, the CPU 107 switches the sheet feed source to the sheet cassette 413 and continues printing.

However, if the CPU 107 detects running out of sheets in the sheet cassette 415 during a job which specifies to use the sheet cassette 415, the CPU 107 does not switch the sheet cassette used as the sheet feed source. This is because the sheet cassette 415 does not belong to any group.

Thus, when the type of a received job or the PDL describing the job is set for a sheet cassette specified by the job, the CPU 107 can switch sheet cassettes within the group in the case of running out of sheets. In this way, stoppage of printing due to running out of sheets can be prevented.

Further, even when the CPU 107 detects running out of sheets, the CPU 107 does not switch the sheet feed source to any sheet cassette that does not belong to the same group as the sheet cassette specified by the received job. Thus, no sheets are fed from such sheet cassette. Furthermore, if the sheets run out during execution of a job of an unintended type or a job described in an unintended PDL, the CPU 107 does not switch the sheet cassette. Thus, when a job of an unintended type is executed, the printing apparatus 102 can avoid using any other sheet cassette different from the specified sheet cassette.

Figure 10:
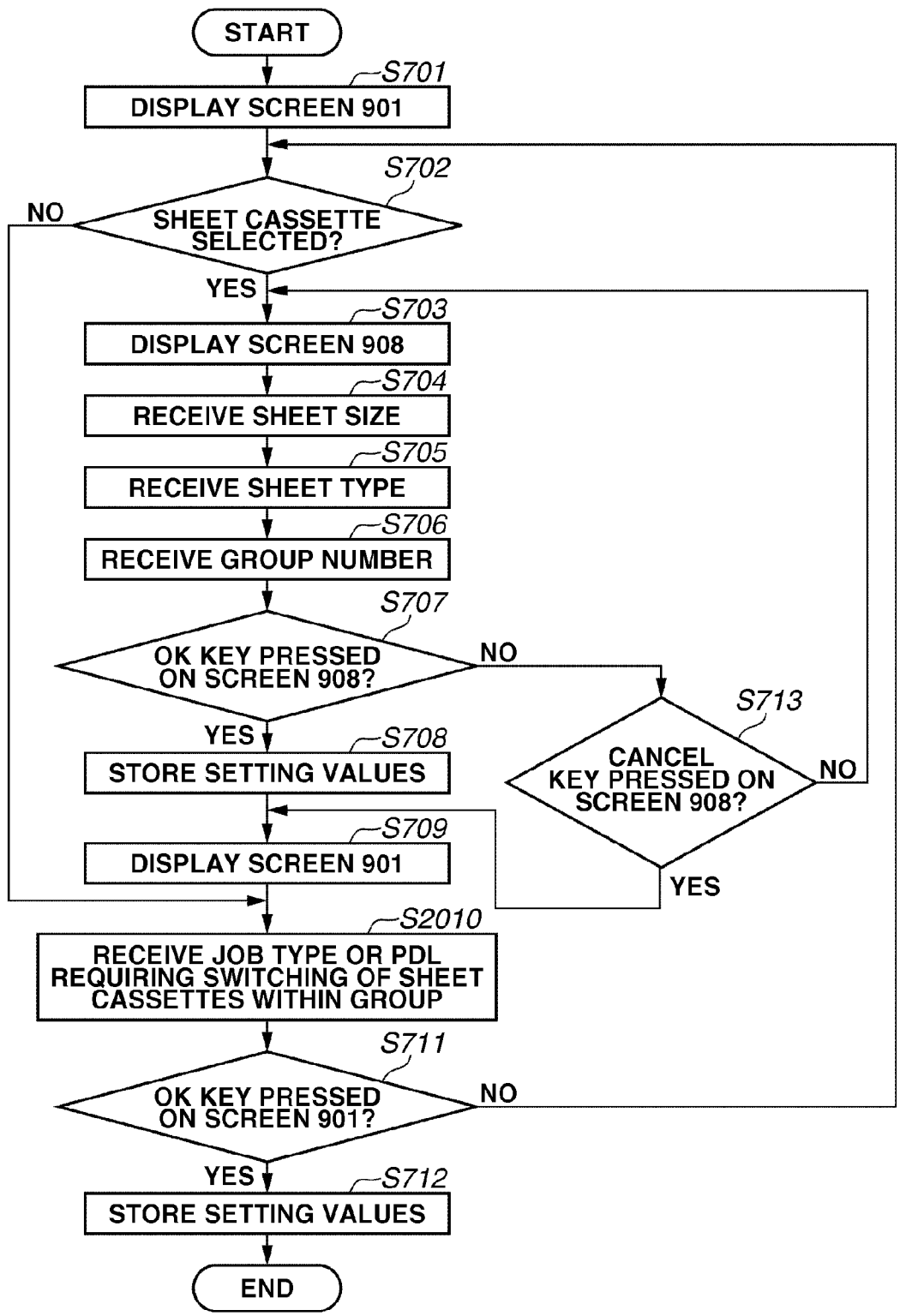
FIG. 10 is a flow chart illustrating a process according to an exemplary embodiment of the present invention.

FIG. 10 is a flow chart illustrating a sheet cassette registration procedure according to the present exemplary embodiment. The process illustrated in the present flowchart is executed by the CPU 107 reading a program stored in the storing unit 109 to the RAM 108 and executing the program.

The flow chart in FIG. 10 includes the similar steps to those in FIG. 6. Thus, these steps are denoted by the same reference numerals, and redundant description thereof will be avoided.

The difference between FIGS. 6 and 10 is step S2010.

In step S2010, on the screen 901, the CPU 107 receives a selection of a job type or PDL requiring switching of the sheet feed source within a group of sheet cassettes in the case of running out of sheets. As the job type, the user can select a print job, a copy job, or a box print job for each sheet cassette. Further, as the PDL, the user can select PS, PCL, LIPS, or ESC/Page. Next, the CPU 107 advances the process to step S711. In step S2010, in the case that a print job is selected, if the CPU 107 receives a print job specifying the sheet cassette, the CPU 107 applies the grouping function irrespective of the PDL. In contrast, in the case that a PDL is selected, only if the CPU 107 receives a print job specifying the sheet cassette and the language of the print job is the selected PDL, the CPU 107 applies the grouping function.

The CPU 107 registers the setting values set in this way in the grouping setting storing unit 117 as the sheet cassette setting.

Figure 11:
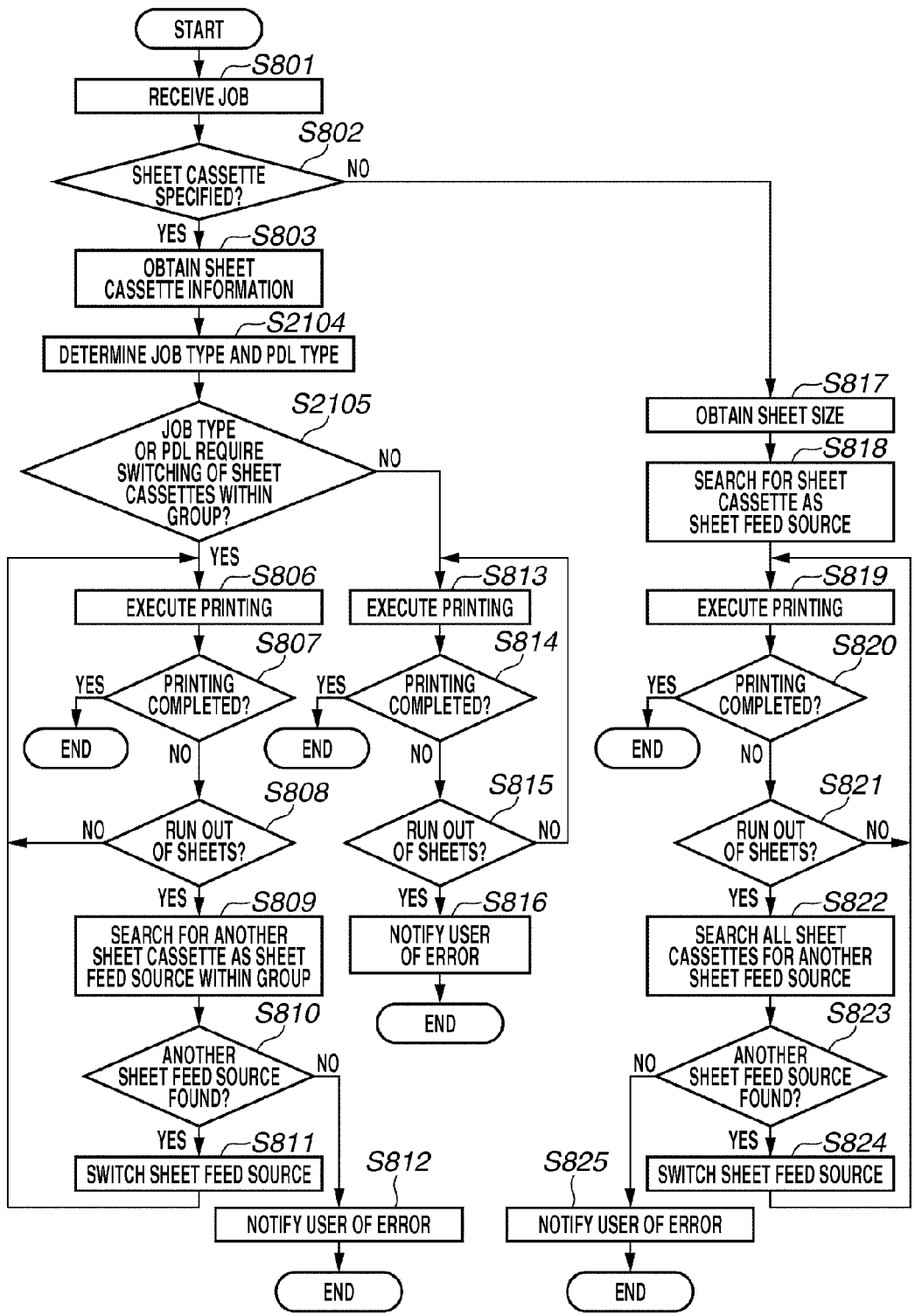
FIG. 11 is a flow chart illustrating a process according to an exemplary embodiment of the present invention.

FIG. 11 is a flow chart illustrating a procedure for processing a job according to the present exemplary embodiment. The process illustrated in the present flow chart is executed by the CPU 107 reading a program stored in the storing unit 109 to the RAM 108 and executing the program.

The flow chart in FIG. 11 includes the similar steps to those in FIG. 7. Thus, these steps are denoted by the same reference numerals, and redundant description thereof will be avoided.

The difference between FIGS. 7 and 11 is steps S2104 and S2105.

In step S803, as in the first exemplary embodiment, the CPU 107 obtains sheet cassette information stored in the grouping setting storing unit 117.

Next, in step S2104, the CPU 107 determines the type and the PDL of the received job. For example, the CPU 107 determines whether the received job is a copy job, a print job, a facsimile job, or a box print job. Further, if the received job is a print job, the CPU 107 refers to header information of the print job and determines the type of the PDL describing the print job. Examples of the PDL determined in step S2104 include PS, PCL, LIPS, and ESC/Page.

Next, in step S2105, the CPU 107 determines whether the sheet cassette specified by the received job is a sheet cassette associated with the job type or the PDL describing the job determined in step S2104. The CPU 107 makes the determination based on the sheet cassette setting stored in the grouping setting storing unit 117.

If the CPU 107 determines that the sheet cassette specified by the received job is associated with the job type or the PDL describing the job determined in step S2104 (YES in step S2105), the CPU 107 advances the process to step S806. In contrast, if the CPU 107 determines that the sheet cassette specified by the received job is not associated with the job type or the PDL describing the job determined in step S2104 (NO in step S2105), the CPU 107 advances the process to step S813.

According to the above-described control, when a plurality of sheet cassettes included in the printing apparatus 102 is grouped, whether to switch sheet cassettes within the group in the case of running out of sheets can be determined according to the job type or the PDL. Thus, for example, even in the case of a print job, when a print job described in a first type PDL is executed, stoppage of printing due to running out of sheets can be prevented. In addition, when a print job described in a second type PDL is executed, the printing apparatus 102 can execute printing by feeding sheets only from a sheet cassette specified by the job.

In the above-described exemplary embodiments, for all the received jobs, the CPU 107 determines whether to switch sheet cassettes within a group in the case of running out of sheets.

In a third exemplary embodiment, the CPU 107 determines whether to switch sheet cassettes within a group in the case of running out of sheets only for a job specified by a user. More specifically, in the case of a job for which a user does not specify to switch sheet cassettes within a group, even if the job type matches the job type specified by a sheet cassette, the CPU 107 does not switch sheet cassettes within a group.

Figure 12:
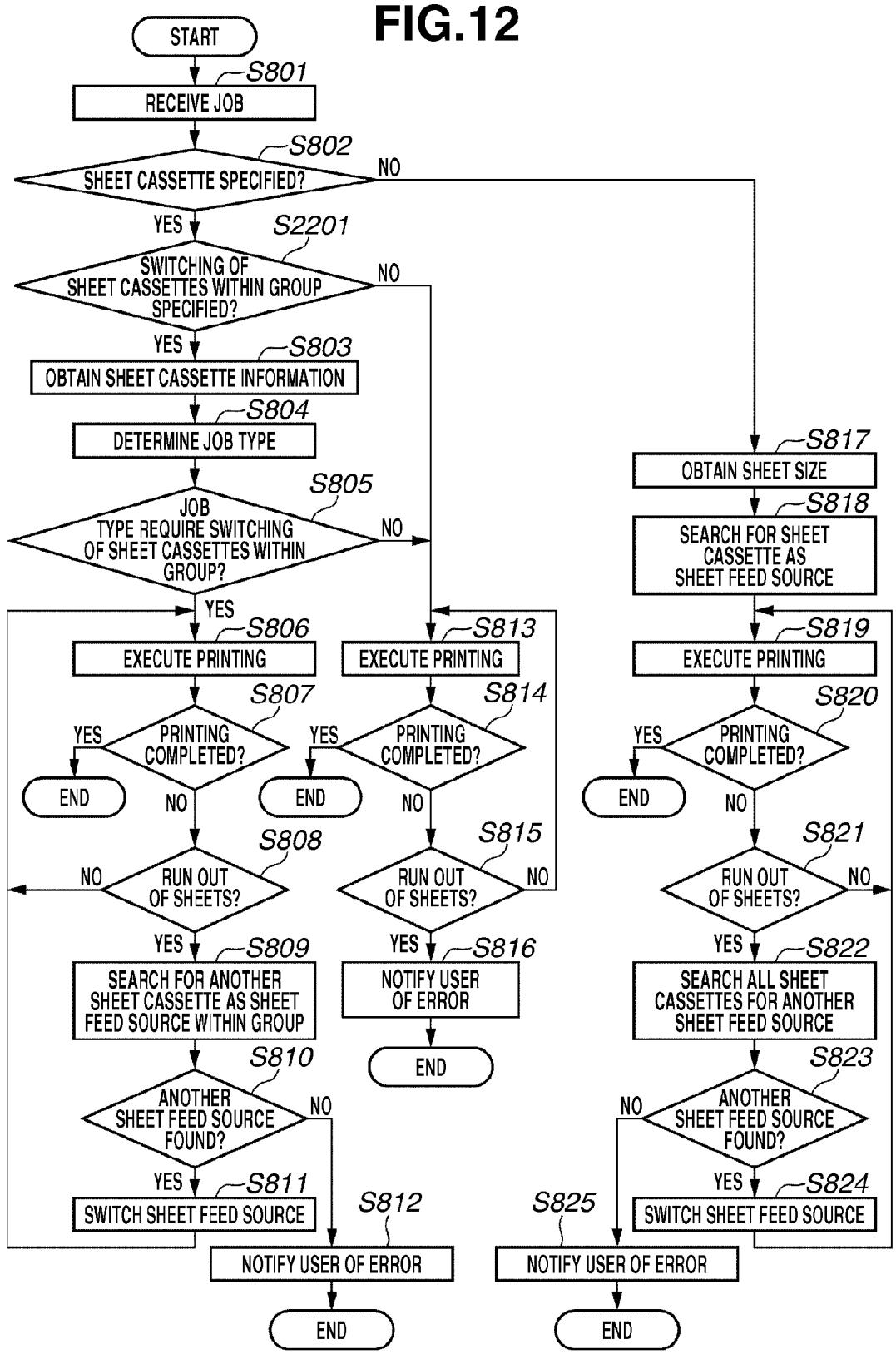
FIG. 12 is a flow chart illustrating a process according to an exemplary embodiment of the present invention.

FIG. 12 is a flowchart illustrating a print operation of a printing system according to the present exemplary embodiment. The process illustrated in the present flow chart is realized by a print job processing unit 0111 executing processing in accordance with a program stored in the storing unit 109 in the printing apparatus 102.

The flow chart in FIG. 12 includes the similar steps to those in FIG. 7. Thus, these steps are denoted by the same reference numerals, and redundant description thereof will be avoided. The difference between FIGS. 7 and 12 is step S2201.

As in the first exemplary embodiment, in step S802, the CPU 107 analyzes the received job and determines whether the job specifies a certain sheet cassette. If the CPU 107 determines that the received job specifies a certain sheet cassette (YES in step S802), the CPU 107 advances the process to step S2201. If not (NO in step S802), the CPU 107 advances the process to step S817.

In step S2201, the CPU 107 determines whether the received job specifies switching of sheet cassettes within a group in the case of running out of sheets. For example, it is assumed that a user gives an instruction to execute a copy job in the state in which a check box 3007 "switch sheet cassettes within group" in FIG. 13C is checked. In this case, the CPU 107 determines that the user specifies switching of sheet cassettes within a group in the case of running out of sheets.

If the CPU 107 determines that the user specifies switching of sheet cassettes within a group in the case of running out of sheets (YES in step S2201), the CPU 107 advances the process to step S803. If not (NO in step S2201), the CPU 107 advances the process to step S813.

According to the above-described control, according to the job to be executed, the user can select whether to switch sheet cassettes within a group in the case of running out of sheets.

According to the present exemplary embodiment, when a copy job is executed, the user can specify to "switch sheet cassettes within group." However, the present invention is not limited to such example. The printing apparatus 102 may be configured to enable a user to specify to "switch sheet cassettes within group" when a print job is executed.

In such case, by providing a printer driver of the PC 101 with an item "switch sheet cassettes within group," a user can specify the item "switch sheet cassettes within group" of the printer driver. While the present exemplary embodiment is described based on the first exemplary embodiment, the specification of "switch sheet cassettes within group" can be applied to the second exemplary embodiment.

In the above-described exemplary embodiments, a job type or a PDL requiring switching of sheet cassettes within a group of sheet cassettes is associated with a sheet cassette and is then registered.

According to a fourth present exemplary embodiment, a job type requiring switching of sheet cassettes within a group of sheet cassettes is set differently from a sheet cassette. When a job of a set job type is executed, the CPU 107 switches sheet cassettes in accordance with all group settings set by the user.

A detailed control operation of the printing apparatus 102 for realizing such function will be described.

Figure 14A:
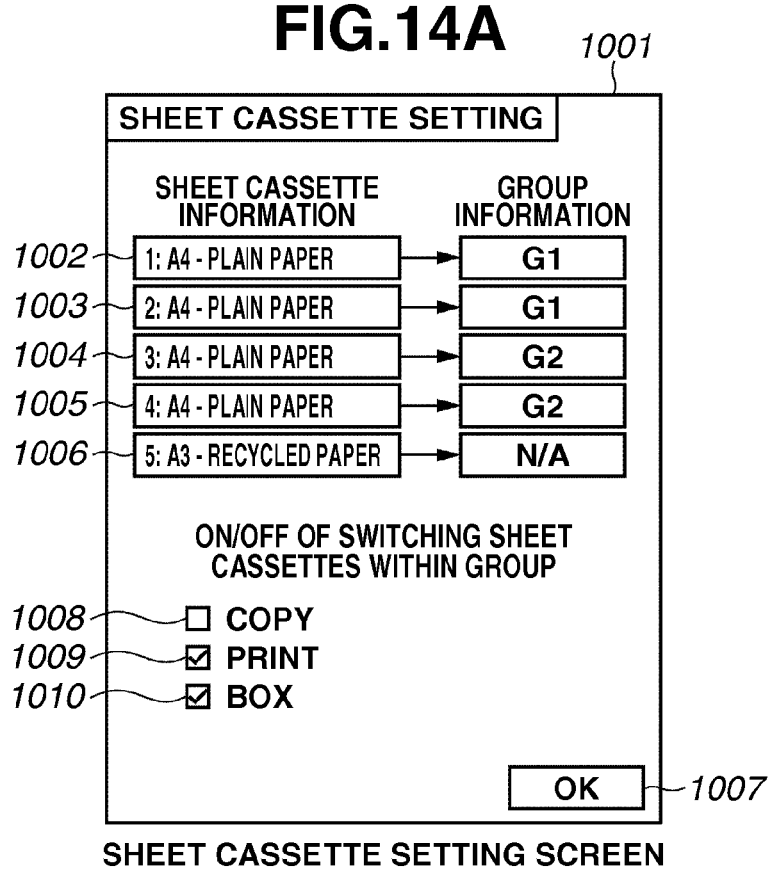
FIGS. 14A and 14B illustrate display screens according to an exemplary embodiment of the present invention.
Figure 14B:
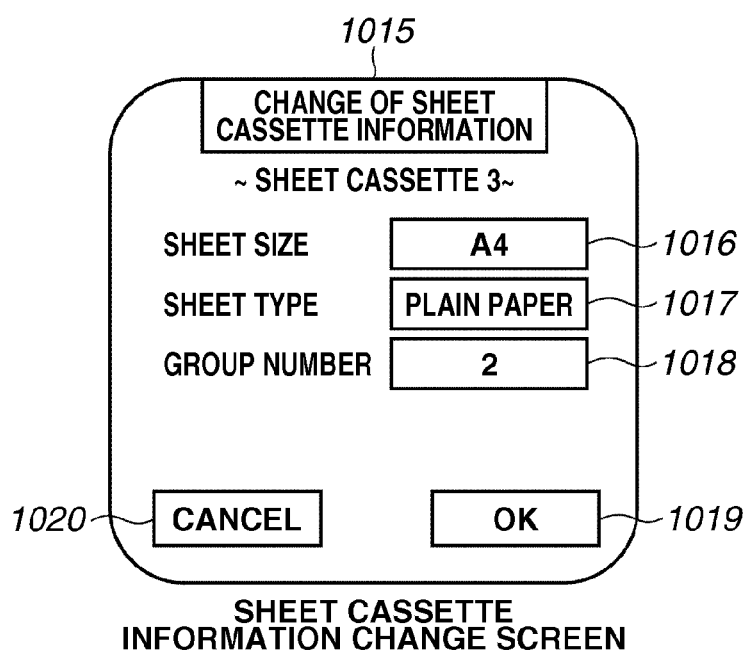

FIGS. 14A and 14B illustrate screens for setting the sheet cassettes according to the present exemplary embodiment.

FIGS. 14A and 14B illustrate screens for setting the sheet cassettes and for setting whether to switch sheet cassettes within a group when sheets run out according to the job type.

The operation unit 112 displays a screen 1001 when a user presses the application mode button 3003 on the screen 3002 in FIG. 13. Alternatively, the printing apparatus 102 may be configured to enable a user to perform settings of the sheet cassettes from the PC 101. In such case, the screen 1001 is displayed on the operation unit 123 of the PC 101.

On the screen 1001, the sheet cassettes have already been grouped. In FIG. 14A, sheet cassette information 1002, 1003, 1004, 1005, and 1006 corresponds to the sheet cassettes 411, 412, 413, 414, and 415, respectively.

In FIG. 14A, the sheet cassette information 1002 indicates that the sheet cassette 411 stores A4-size plain paper, and the corresponding group information indicates that the sheet cassette 411 belongs to G1 (group 1).

In addition, the sheet cassette information 1003 indicates that the sheet cassette 412 stores A4-size plain paper, and the corresponding group information indicates that the sheet cassette 412 belongs to the same group G1 as the sheet cassette 411.

In addition, the sheet cassette information 1004 indicates that the sheet cassette 413 stores A4-size plain paper, and the corresponding group information indicates that the sheet cassette 413 belongs to G2 (group 2) different from that of the sheet cassettes 411 and 412.

In addition, the sheet cassette information 1005 indicates that the sheet cassette 414 stores A4-size plain paper, and the corresponding group information indicates that the sheet cassette 414 belongs to the same group G2 as the sheet cassette 413.

Finally, the sheet cassette information 1006 indicates that the sheet cassette 415 stores A3-size recycled paper, and the corresponding group information indicates that the sheet cassette 415 does not belong to any group.

When a user selects any sheet cassette information or group information on the screen 1001 via the touch panel, the operation unit 112 displays a screen 1015 illustrated in FIG. 14B.

The user can change information about the corresponding sheet cassette on this screen 1015.

In the example illustrated in FIG. 14B, the sheet cassette information and the group information about the sheet cassette 413 is displayed. In FIG. 14B, a sheet size 1016 and a sheet type 1017 are indicated as the sheet cassette information, and a group number 1018 is indicated as the group information.

If a user wishes to change the setting content of one of these items, the user touches the corresponding item on this screen.

For example, the user touches the sheet size 1016 and sets the sheet size (A4-size, A3-size, letter size, or the like) of sheets stored in the sheet cassette 412 in the printing apparatus 102. Various sheet size options may be displayed in the form of a pull-down menu or in the form of a pop-up menu so that the user can select a desired sheet size.

If a user wishes to change the sheet type 1017, the user specifies the sheet type 1017 and sets the sheet type (plain paper, recycled paper, coated paper, thick paper, or the like) of sheets stored in the sheet cassette 413 in the printing apparatus 102. As in the case of the sheet size, various sheet type options may be displayed in the form of a pull-down menu or in the form of a pop-up menu so that the user can select a desired sheet type.

If a user wishes to change the group number 1018, the user specifies the group number 1018 and sets an arbitrary group number.

After setting the sheet size 1016, the sheet type 1017, and the group number 1018, the user selects an OK key 1019. When the OK key 1019 is selected, the CPU 107 stores the set values in the grouping setting storing unit 117 and displays the sheet cassette setting screen 1001 on the operation unit 112.

On the other hand, if the user does not wish to store the values set for the sheet size 1016, the sheet type 1017, and the group number 1018, the user selects a cancel key 1020. If the cancel key 1020 is pressed, the CPU 107 displays the sheet cassette setting screen 1001 without storing the setting values in the grouping setting storing unit 117.

Finally, if an OK key 1007 is pressed, the CPU 107 hides the sheet cassette setting screen 1001 and displays the screen in FIG. 13A on the operation unit 112. In this way, the sheet cassette setting is executed.

The user uses check boxes 1008 to 1010 in FIG. 14A to specify, according to the job type, whether to switch sheet cassettes within a group in the case of running out of sheets. The check box 1008 is used to determine whether to switch sheet cassettes within a group when sheets run out during execution of a copy job.

If the check box 1008 is checked, the CPU 107 switches sheet cassettes within a group to which the specified sheet cassette belongs during execution of a copy job specifying the sheet cassette. On the other hand, if the check box 1008 is not checked, the CPU 107 does not switch sheet cassettes irrespective of whether the sheet cassette is grouped during execution of a copy job specifying the sheet cassette.

The check box 1009 is used to determine whether to switch sheet cassettes within a group when sheets run out during execution of a print job. The check box 1010 is used to determine whether to switch sheet cassettes within a group when sheets run out during execution of a box print job. A plurality of these check boxes 1008 to 1010 can be selected. The user can register two or more types of job types requiring switching of sheet cassettes within a group in the case of running out of sheets.

In FIG. 14A, the sheet cassettes are set so that the CPU 107 switches sheet cassettes within a group of sheet cassettes when executing a print job or a box print job.

The OK key 1007 is a key for fixing the information set on the screen 1001.

If the OK key 1007 is pressed, the CPU 107 stores the set values in the grouping setting storing unit 117 and displays the copy function initial screen illustrated in FIG. 13A on the operation unit 112.

FIG. 15 illustrates grouping settings defined for a plurality of sheet cassettes according to the present exemplary embodiment of the present invention.

In the setting of group number 1 in FIG. 15, the sheet cassettes 411 and 412 are set as one group (G1). In addition, based on the checks in the check boxes 1009 and 1010, the CPU 107 is set to switch the sheet cassettes 411 and 412 within the group in the case of running out of sheets only when a print job or a box print job is executed.

In this case, if the CPU 107 detects running out of sheets in the sheet cassette 411 during a print job or a box print job specifying the sheet cassette 411, the CPU 107 switches the sheet feed source to the sheet cassette 412 and continues printing.

Alternatively, if the CPU 107 detects running out of sheets in the sheet cassette 412 during a print job or a BOX print job specifying the sheet cassette 412, the CPU 107 switches the sheet feed source to the sheet cassette 411 and continues printing.

In contrast, in the case that the CPU 107 executes a copy job specifying the sheet cassette 411, if the sheets in the sheet cassette 411 run out, the CPU 107 notifies a user of an error message without switching the sheet feed source. The same applies to when the CPU 107 executes a copy job specifying the sheet cassette 412. If the sheets in the sheet cassette 412 run out, the CPU 107 notifies a user of an error message without switching the sheet feed source. In other words, only when a print job or a BOX print job specifying the sheet cassette 411 or 412 is executed, the CPU 107 switches sheet cassettes within a group in the case of running out of sheets.

In the setting of group number 2 in FIG. 15, the sheet cassettes 413 and 414 are set as one group (G2). In addition, based on the checks in the check boxes 1009 and 1010, the CPU 107 is set to switch the sheet cassettes 413 and 414 within the group in the case of running out of sheets only when a print job or a box print job is executed.

In this case, if the CPU 107 detects running out of sheets in the sheet cassette 413 during a print job or a box print job specifying the sheet cassette 413, the CPU 107 switches the sheet feed source to the sheet cassette 414 and continues printing.

Alternatively, if the CPU 107 detects running out of sheets in the sheet cassette 414 during a print job which specifies to use the sheet cassette 414, the CPU 107 switches the sheet feed source to the sheet cassette 413 and continues printing.

However, if the CPU 107 detects running out of sheets in the sheet cassette 415 during a job which specifies to use the sheet cassette 415, the CPU 107 does not switch the sheet cassette used as the sheet feed source. This is because the sheet cassette 415 does not belong to any group.

Thus, in the case of execution of a job specifying a sheet cassette, if the type of the job is set by a user separately from the sheet cassette information, stoppage of printing due to running out of sheets can be prevented. In addition, when a job of the set type is executed, the printing apparatus 102 can avoid feeding sheets from a sheet cassette that does not belong to the same group as the specified sheet cassette. Further, if the sheets run out during execution of a job of a type other than the set type, the CPU 107 does not switch sheet cassettes. In this way, use of a sheet cassette that is not intended by the user can be prevented.

In the case where sheets in a sheet cassette run out and there is a plurality of options as a new sheet feed source, the CPU 107 performs control to preferentially select a sheet cassette closest to the image forming unit 403 as the new sheet feed source.

Figure 16:
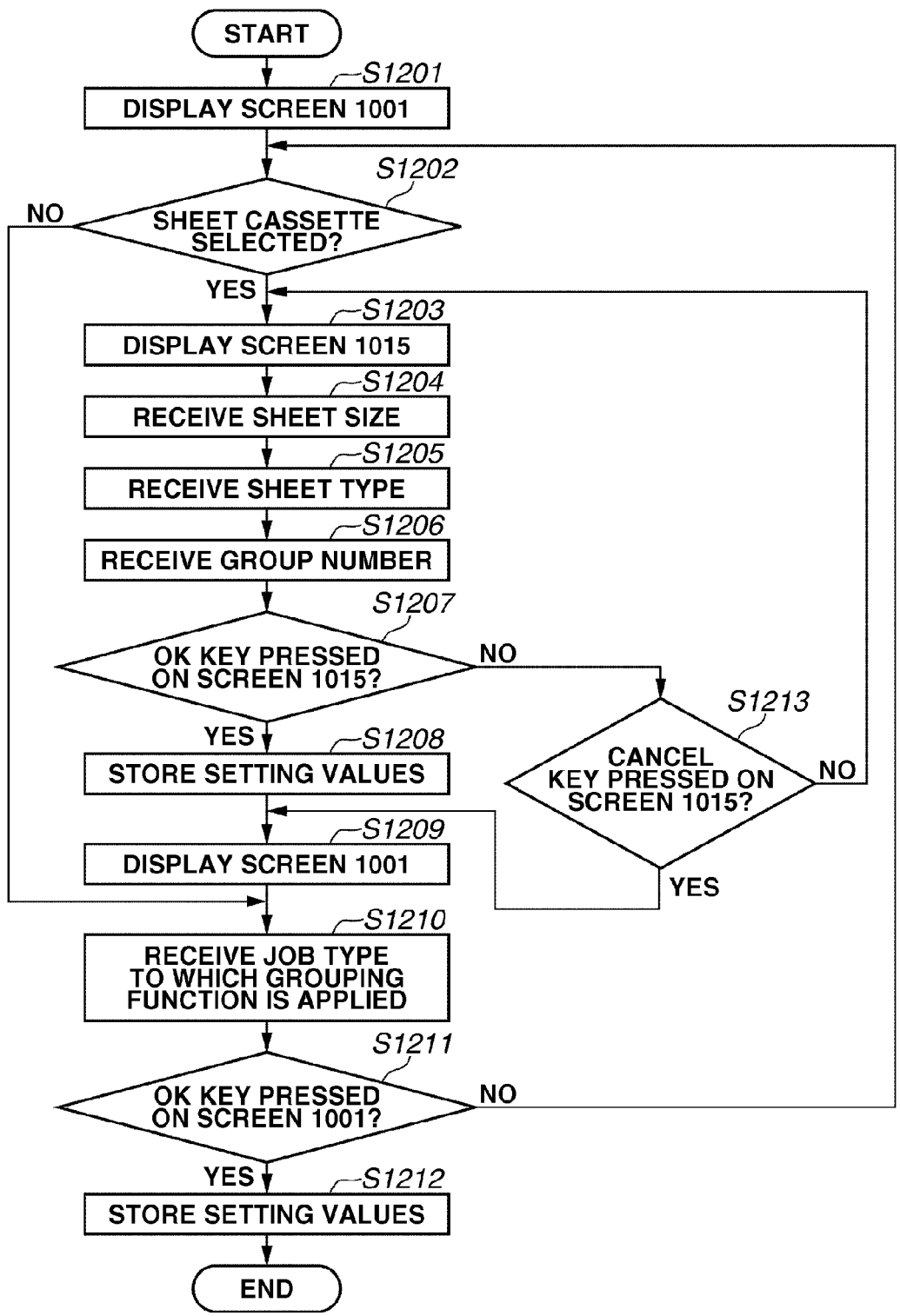
FIG. 16 is a flow chart illustrating a process according to an exemplary embodiment of the present invention.

FIG. 16 is a flow chart illustrating a sheet cassette registration procedure according to the present exemplary embodiment. The process illustrated in the present flow chart is executed by the CPU 107 reading a program stored in the storing unit 109 to the RAM 108 and executing the program.

The CPU 107 starts the process illustrated in the flow chart in FIG. 16 when the sheet cassette setting screen 1001 is called via the operation unit 112 of the printing apparatus 102.

First, in step S1201, the CPU 107 displays the sheet cassette setting screen 1001 on the operation unit 112.

Next, in step S1202, the CPU 107 receives a selection of a sheet cassette via the sheet cassette setting screen 1001. If a sheet cassette is selected (YES in step S1202), the CPU 107 advances the process to step S1203. If not (NO in step S1202), the CPU 107 advances the process to step S1210.

In step S1203, the CPU 107 displays the screen 1015 on the operation unit 112.

In step S1204, the CPU 107 receives a size of sheets stored in the sheet cassette selected in step S1202 via the screen 1015.

In step S1205, the CPU 107 receives a type of the sheets stored in the sheet cassette selected in step S1202 via the screen 1015.

In step S1206, the CPU 107 receives a group number set for the sheet cassette selected in step S1202 via the screen 1015. The CPU 107 may receive the settings in steps S1204 to S1206 in a different order.

In step S1207, the CPU 107 determines whether the OK key 1019 is pressed on the screen 1015. If the OK key 1019 is pressed (YES in step S1207), the CPU 107 advances the process to step S1208. If not (NO in step S1207), the CPU 107 advances the process to step S1213.

In step S1208, the CPU 107 stores the received setting values in the grouping setting storing unit 117 as the sheet cassette setting and advances the process to step S1209.

When the CPU 107 advances the process to step S1213, in step S1213, the CPU 107 determines whether the cancel key 1020 is pressed on the screen 1015. If the cancel key 1020 is pressed (YES in step S1213), the CPU 107 advances the process to step S1209. If not (NO in step S1213), the CPU 107 advances the process to step S1203.

In step S1209, the CPU 107 displays the screen 1001 on the operation unit 112.

In step S1210, the CPU 107 receives a selection of a job type to which the grouping function is applied on the screen 1015. The user can select a print job, a copy job, a fax job, or a box print job, as the job type to which the grouping function is applied. The user can make the selection by using the check boxes 1008 to 1010 in FIG. 14A.

In step S1211, the CPU 107 determines whether the OK key 1007 is pressed on the screen 1001. If the CPU 107 determines that the OK key 1007 is pressed (YES in step S2011), the CPU 107 advances the process to step S1212. In step S1212, the CPU 107 stores a setting value indicating the job type received in step S1210 in the grouping setting storing unit 117 as the sheet cassette setting. In addition, the CPU 107 hides the screen 1001 and ends the process in the flowchart in FIG. 16. At that time, the copy function initial screen illustrated in FIG. 13A is displayed on the operation unit 112.

In step S1211, if the CPU 107 determines that the OK key 1007 is not pressed (NO in step S1211), the CPU 107 returns the process to step S1202 and waits for a selection of a sheet cassette again.

In this way, the sheet cassette setting is registered in the grouping setting storing unit 117.

Figure 17:
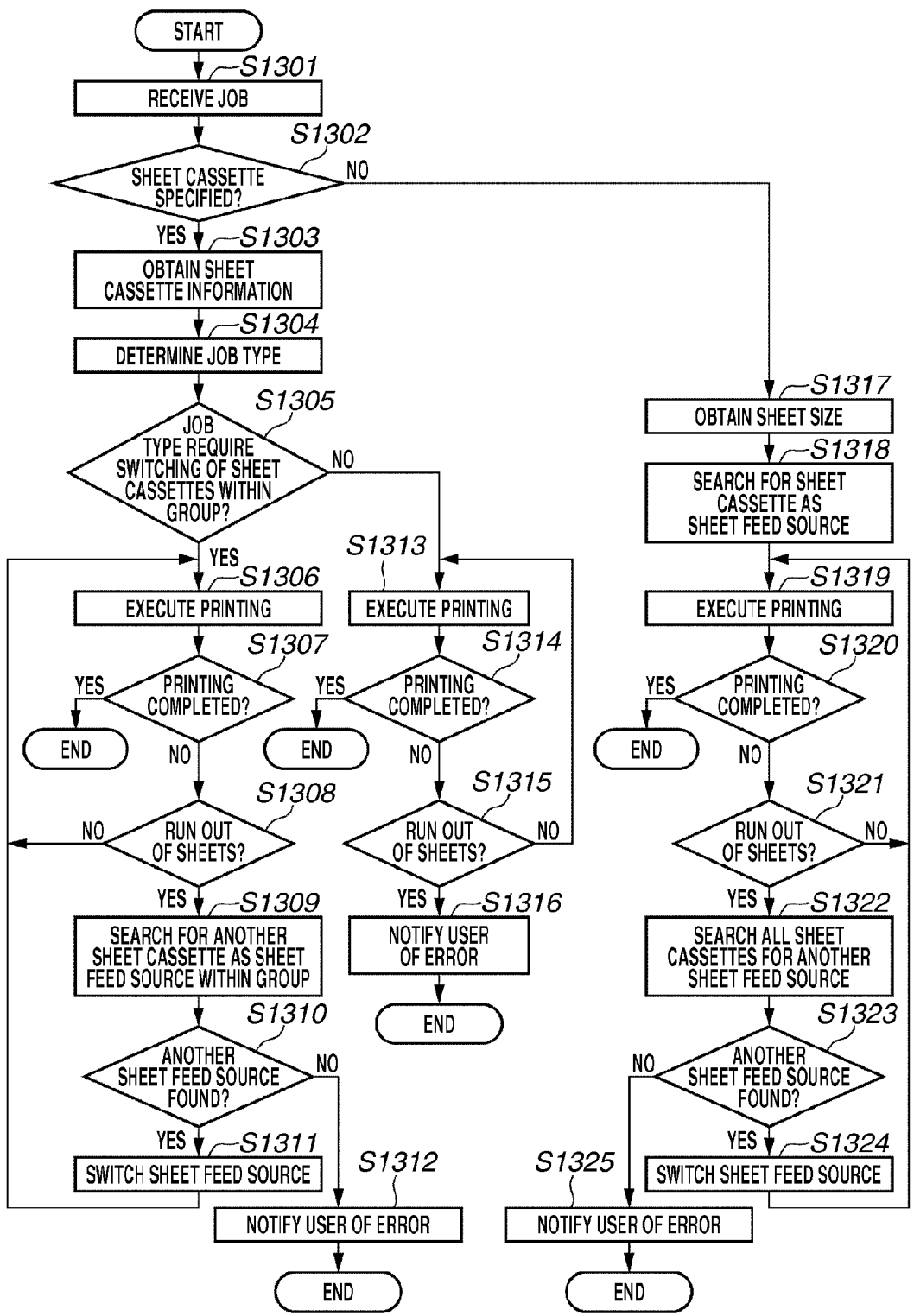
FIG. 17 is a flow chart illustrating a process according to an exemplary embodiment of the present invention.

FIG. 17 is a flow chart illustrating a procedure for processing a job according to the present exemplary embodiment. The process illustrated in the present flow chart is executed by the CPU 107 reading a program stored in the storing unit 109 to the RAM 108 and executing the program.

First, in step S1301, the CPU 107 receives a job. Examples of the job include the above-described copy job, print job, and box print job.

In step S1302, the CPU 107 analyzes the received job and determines whether the job specifies a certain sheet cassette. In the case of a copy job or a box print job, a certain sheet cassette can be specified by pressing the "cassette 1" to "cassette 5" buttons on the screen in FIG. 13B displayed on the operation unit 112. In the case of a print job, a certain sheet cassette can be specified on a screen which has functions similar to those in FIG. 13B and is displayed on the operation unit 123 of the PC 101.

If the CPU 107 determines that the received job specifies a certain sheet cassette (YES in step S1302), the CPU 107 advances the process to step S1303. If not (NO in step S1302), the CPU 107 advances the process to step S1317.

In step S1303, the CPU 107 obtains sheet cassette information stored in the grouping setting storing unit 117.

In step S1304, the CPU 107 determines the type of the received job. For example, the CPU 107 determines whether the received job is a copy job, a print job, or a box print job.

In step S1305, the CPU 107 determines whether the type of the received job is checked in any one of the check boxes 1008 to 1010. If the received job is checked in any one of the check boxes 1008 to 1010 (YES in step S1305), the CPU 107 advances the process to step S1306.

If the received job is not checked in any one of the check boxes 1008 to 1010 (NO in step S1305), the CPU 107 advances the process to step S1313.

In step S1306, the CPU 107 executes printing. In step S1306, the CPU 107 controls the sheet cassette specified by the job to feed a sheet and controls the printing unit 114 to print an image on the fed sheet.

In step S1307, the CPU 107 determines whether printing is completed. If the CPU 107 determines that printing is completed (YES in step S1307), the CPU 107 ends the process. If not (NO in step S1307), the CPU 107 advances the process to step S1308.

In step S1308, the CPU 107 determines whether sheets in the sheet cassette as the sheet feed source run out based on a signal from the above-described sheet detection sensor. The CPU 107 can determine as running out of sheets when the number of remaining sheets in the sheet cassette reaches zero.

In step S1308, if the CPU 107 determines as running out of sheets (YES in step S1308), the CPU 107 advances the process to step S1309. If not (NO in step S1308), the CPU 107 returns the process to step S1306 and continues printing.

In step S1309, the CPU 107 refers to the grouping setting storing unit 117 to determine whether there is another sheet cassette storing sheets within the same group to which the sheet cassette that has been used belongs.

In step S1310, the CPU 107 determines whether another sheet cassette has been found. If another sheet cassette has been found (YES in step S1310), the CPU 107 advances the process to step S3111. In step S1311, the CPU 107 switches the sheet feed source to the new sheet cassette that has been found, and then advances the process to step S1306 to continue printing.

However, if another sheet cassette has not been found (NO in step S1310), the CPU 107 advances the process from step S1310 to step S1312. In step S1312, the CPU 107 displays a message "replenish sheets in the sheet cassette" on the operation unit 112 and ends the process.

If the process proceeds from step S1305 to step S1313, in step S1313, the CPU 107 controls the sheet cassette specified by the job to feed a sheet and controls the printing unit 114 to print an image on the fed sheet.

In step S1314, the CPU 107 determines whether printing is completed. If the CPU 107 determines that printing is completed (YES in step S1314), the CPU 107 ends the process. If not (NO in step S1314), the CPU 107 advances the process to step S1315.

In step S1315, the CPU 107 determines whether sheets in the sheet cassette as the sheet feed source run out based on a signal from the above-described sheet detection sensor. The CPU 107 can determine as running out of sheets when the number of remaining sheets in the sheet cassette reaches zero.

In step S1316, the CPU 107 displays a message "replenish sheets in the sheet cassette" on the operation unit 112 and ends the process.

If the process proceeds from step S1302 to step S1317, in step S1317, the CPU 107 analyzes the job and obtains a sheet size specified by the job.

In step S1318, the CPU 107 refers to the sheet cassette information set in the grouping setting storing unit 117 and searches for a sheet cassette to be the sheet feed source. In this step, the CPU 107 identifies the sheet size specified by the job and searches for a sheet cassette storing the identified size sheet.

In step S1319, the CPU 107 controls the sheet cassette found as a result of the search to feed a sheet and controls the printing unit 114 to print an image on the fed sheet.

In step S1320, the CPU 107 determines whether printing is completed. If the CPU 107 determines that printing is completed (YES in step S1320), the CPU 107 ends the process. If not (NO in step S1320), the CPU 107 advances the process to step S1321.

In step S1321, the CPU 107 determines whether sheets in the sheet cassette as the sheet feed source run out based on a signal from the above-described sheet detection sensor. The CPU 107 can determine as running out of sheets when the number of remaining sheets in the sheet cassette reaches zero.

In step S1321, if the CPU 107 determines as running out of sheets (YES in step S1321), the CPU 107 advances the process to step S1322. If not (NO in step S1321), the CPU 107 continues printing.

In step S1322, the CPU 107 searches all the sheet cassettes included in the printing apparatus 102 for another sheet cassette storing the sheet size specified by the job.

In step S1323, the CPU 107 determines whether another sheet cassette has been found. If another sheet cassette has been found (YES in step S1323), the CPU 107 advances the process to step S1324. If not (NO in step S1323), the CPU 107 advances the process to step S1325. In step S1325, the CPU 107 displays a message "replenish sheets in the sheet cassette" on the operation unit 112 and ends the process.

According to the above-described control, when a plurality of sheet cassettes included in the printing apparatus 102 is grouped, whether to switch sheet cassettes within the group in the case of running out of sheets can be determined according to a job. Thus, for example, when a job of a first type is executed, stoppage of printing due to running out of sheets can be prevented, and when a job of a second type is executed, the printing apparatus 102 can execute printing by feeding sheets only from a sheet cassette specified by the job.

Further, according to the present exemplary embodiment, after a plurality of sheet cassettes is registered as one group, a user can easily set switching of the sheet feed source among the sheet cassettes in the group in the case of running out of sheets if the user wishes to perform the switching on a plurality of job types. For example, after registering the sheet cassettes 413 and 414 as one group, if the user wishes to apply the group to a print job and a BOX print job, the user checks the corresponding check boxes in FIG. 14A. In this way, the user can easily achieve the setting.

In steps S1307, S1314, and S1319, the CPU 107 determines as running out of sheets if the number of remaining sheets in the sheet cassette reaches zero. However, the present invention is not limited to such example. For example, the CPU 107 may determine as running out of sheets if the number of remaining sheets in the sheet cassette falls below a certain amount, instead of zero.

In the above-described exemplary embodiment, a case in which the CPU 107 executes a copy job in accordance with the setting received via the screens illustrated in FIGS. 13A to 13C is mainly described. However, the present invention is not limited to such example. For example, the present invention is applicable to a print job that is input by displaying screens having functions similar to those of the screens illustrated in FIGS. 13A to 13C on the display unit 124 of the PC 101 and receiving print settings via the operation unit 123.

In addition, the present invention is also applicable to a BOX print job that is input by displaying screens having functions similar to those illustrated in FIGS. 13A to 13C for reading image data stored in the storing unit 109 and receiving print settings from a user via such screens.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-035117 filed Feb. 21, 2012, which is hereby incorporated by reference herein in its entirety.

What is claimed is:

1. A printing apparatus which is able to feed a sheet from any of a plurality of storage units, the printing apparatus comprising:
a registering unit configured to register two or more groups wherein each of the two or more groups has two or more storage units included in the plurality of storage units;
a setting unit configured to set a type of job for each of the two or more groups independently; and
a control unit configured to,
in a case where a type of a received job matches a type set by the setting unit in association with a group to which a first storage unit used for the received job belongs, perform control to switch a sheet feeding source from the first storage unit to a second storage unit which belongs to the same group as that as the first storage unit when an amount of sheets in the first storage unit reaches a certain amount during execution of the received job, and in a case where the type of the received job does not match the type set by the setting unit in association with the group to which the first storage unit used by the received job belongs, perform control not to switch the sheet feeding source from the first storage unit to the second storage unit which belongs to the same group as that of the first storage unit even when the amount of sheets in the first storage unit reaches the certain amount during execution of the received job.

2. The printing apparatus according to claim 1, wherein the type set by the setting unit includes at least one of a copy job, a print job, or a BOX print job.

3. The printing apparatus according to claim 1, wherein the first storage unit is designated in the received job.

4. The printing apparatus according to claim 1, further comprising a notification unit configured to notify a user of an error, in a case where the type of the received job does not match the type set by the setting unit in association with the group to which the first storage unit used for the received job belongs and the amount of sheets in the first storage unit reaches the certain amount during execution of the received job.

5. The printing apparatus according to claim 1, wherein the certain amount is not zero.

6. The printing apparatus according the claim 1,
wherein, in a case where the switching the sheet is not designated in the received job, the control unit is configured to perform control not to switch the sheet feeding source from the first storage unit to the second storage unit which belongs to the same group as that of the first storage unit when the amount of sheets in the first storage unit reaches the certain amount during execution of the received job, even when the type of the received job matches the type set by the setting unit in association with the group to which the first storage unit used for the received job belongs.

7. A method for controlling a printing apparatus which is able to convey a sheet from any of a plurality of storage units, the method comprising:
registering two or more groups wherein each of the two or more groups has two or more storage units included in the plurality of storage units;

setting a type of job for each of the two or more groups independently;

in a case where a type of a received job matches a type set by the setting in association with a group to which a first storage unit used for the received job belongs, perform control to switch a sheet feeding source from the first storage unit to a second storage unit which belongs to the same group as that as the first storage unit when an amount of sheets in the first storage unit reaches a certain amount during execution of the received job; and in a case where the type of the received job does not match the type set by the setting in association with the group to which the first storage unit used by the received job belongs, perform control not to switch the sheet feeding source from the first storage unit to the second storage unit which belongs to the same group as that of the first storage unit even when the amount of sheets in the first storage unit reaches the certain amount during execution of the received job.

8. A non-transitory computer-readable storage medium for storing a computer program for controlling a printing apparatus which is able to convey a sheet from any of a plurality of storage units, the computer program comprising:

a code to register two or more groups wherein each of the two or more groups has two or more storage units included in the plurality of storage units;

a code to set a type of job for each of the two or more groups independently;

a code to, in a case where a type of a received job matches a type set by the code to set in association with a group to which a first storage unit used for the received job belongs, perform control to switch a sheet feeding source from the first storage unit to a second storage unit which belongs to the same group as that as the first storage unit when an amount of sheets in the first storage unit reaches a certain amount during execution of the received job; and a code to, in a case where the type of the received job does not match the type set by the code to set in association with the group to which the first storage unit used by the received job belongs, perform control not to switch the sheet feeding source from the first storage unit to the second storage unit which belongs to the same group as that of the first storage unit even when the amount of sheets in the first storage unit reaches the certain amount during execution of the received job.

* * * * *